United States Patent [19]

Muller

[11] Patent Number: 4,587,721
[45] Date of Patent: May 13, 1986

[54] METHOD OF ASSEMBLING A ROTATABLE ASSEMBLY, APPARATUS AND METHOD OF OPERATING SUCH

[75] Inventor: Alexander Muller, Holland, Mich.

[73] Assignee: General Electric Company, Fort Wayne, Ind.

[21] Appl. No.: 630,872

[22] Filed: Jul. 13, 1984

Related U.S. Application Data

[63] Continuation-in-part of Ser. No. 616,200, Jun. 1, 1984, which is a continuation-in-part of Ser. No. 593,840, Mar. 27, 1984.

[51] Int. Cl.$^4$ .............................................. H02K 15/02
[52] U.S. Cl. ........................................ 29/596; 29/598; 29/732; 29/744; 29/759
[58] Field of Search ................. 29/598, 596, 732, 744, 29/759; 310/156, 152, 218, 262, 271, 42, 46

[56] References Cited

U.S. PATENT DOCUMENTS

| | | | |
|---|---|---|---|
| 3,221,194 | 11/1965 | Blackburn | 310/156 |
| 3,531,670 | 9/1970 | Loudon | 310/156 |
| 4,059,898 | 11/1977 | Adair | 29/598 |
| 4,199,861 | 4/1980 | Buckman et al. | 310/42 |
| 4,316,605 | 2/1982 | Zachry et al. | 29/744 |
| 4,351,103 | 9/1982 | Rodenbeck | 29/732 |
| 4,427,911 | 1/1984 | Manson | 310/156 |
| 4,443,934 | 4/1984 | Hickey | 29/732 |
| 4,449,289 | 5/1984 | Kindig | 29/732 |

FOREIGN PATENT DOCUMENTS

| | | | |
|---|---|---|---|
| 19369 | 2/1981 | Japan | 310/152 |
| 664902 | 1/1952 | United Kingdom | 310/156 |

*Primary Examiner*—Mark Rosenbaum
*Assistant Examiner*—P. W. Echols
*Attorney, Agent, or Firm*—Joseph E. Papin

[57] ABSTRACT

A method of assembling a rotatable assembly. A set of generally arcuate magnet material elements are moved toward assembly positions with respect to a circumferential surface of a rotatable member. During this movement, the positions of at least some of the magnet material elements are adjusted generally circumferentially about the circumferential surface of the rotatable assembly to establish at least generally equal gaps between adjacent opposed ones of a pair of opposite marginal edges on the magnet material elements defining the arcuate lengths thereof, respectively. Apparatus for assembling a rotatable assembly and a method of operating such apparatus are also disclosed.

44 Claims, 19 Drawing Figures

SEGMENTS
ARC
LENGTHS
120°
120°
120°
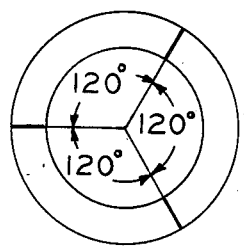
GAPS → 0,0,0  FIG. 11A
PRIOR ART
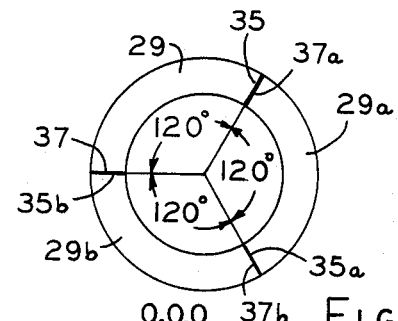
0,0,0  FIG. 12A
117°
120°
117°
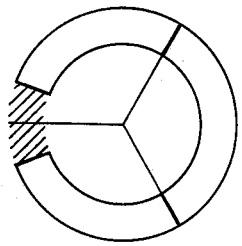
GAPS → 6,0,0  FIG. 11B
PRIOR ART
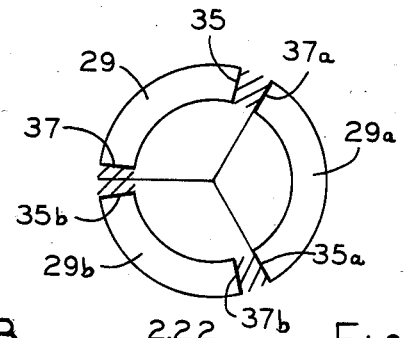
2,2,2  FIG. 12B
120°
120°
117°
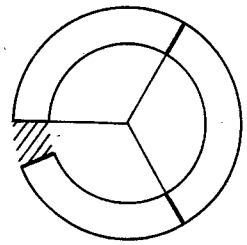
GAPS → 3,0,0  FIG. 11C
PRIOR ART
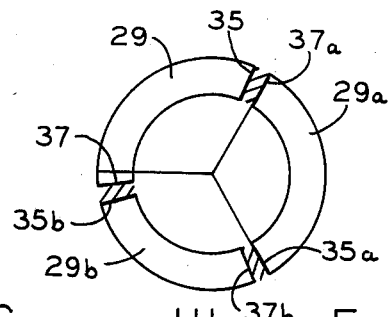
1,1,1  FIG. 12C
117°
117°
117°
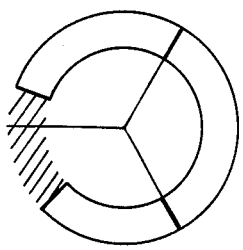
GAPS → 9,0,0  FIG. 11D
PRIOR ART
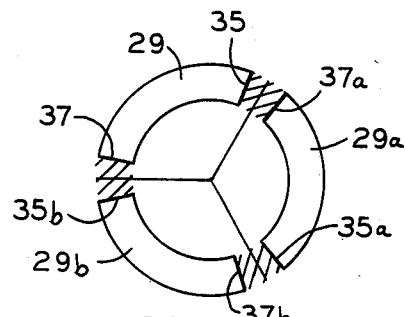
3,3,3  FIG. 12D

METHOD OF ASSEMBLING A ROTATABLE ASSEMBLY, APPARATUS AND METHOD OF OPERATING SUCH

CROSS-REFERENCE TO RELATED APPLICATIONS

This application is a continuation-in-part of application Serial No. 616,200 filed June 1, 1984 which in turn is a continuation-in-part of application Ser. No. 593,840 filed Mar. 27, 1984, and the disclosures of applications Ser. No. 616,200 and Ser. No. 593,840 are incorporated herein by reference.

FIELD OF THE INVENTION

This application relates in general to dynamoelectric machines and in particular to an improved method of assembling a rotatable assembly, improved apparatus, and an improved method of operating apparatus for assembling a rotatable assembly.

BACKGROUND OF THE INVENTION

In the past, various different methods have been utilized to secure arcuate shaped magnet material elements formed of a frangible material to a circumferential surface of a rotor core. In one of these past methods, the rotor core was provided with protrusions which were associated in displacement preventing engagement with the arcuate magnet material elements thereby to maintain them in place seated against the circumferential surface of the rotor core. In another of the past methods, a fiber, plastic or metallic wrap or sleeve was provided enveloping at least the arcuate outer surfaces of the magnet material elements thereby to maintain the magnet material elements against displacement from their seated engagement with the circumferential surface of the rotor core.

In still another of the aforementioned past methods of securing arcuate magnet material elements to a rotor core, a hardenable adhesive material was applied to at least one of the circumferential surface of the rotor core and the arcuate inner surfaces of the magnet material elements. After such application of the hardenable adhesive material, the arcuate inner surfaces of the magnet material elements were seated or abutted against the circumferential surface of the rotor core, and in this position, the permanent magnet material elements and the circumferential surface of the rotor core were merely clamped together until the hardenable adhesive material set or hardened thereby to adhere together the magnet material elements and the circumferential surface of the rotor core. Since both the arcuate inner surfaces of the magnet material elements and the circumferential surface of the rotor core may have high points or areas due to tolerance variations during the manufacture thereof, the arcuate inner surfaces of magnet material elements and the circumferential surface rotor core were at least in part in surface-to-surface engagement with each other; due at least in part to such aforementioned surface-to-surface engagement, it is believed that one of the disadvantageous or undesirable features of this past method was that some of the frangible arcuate magnet material elements fractured or cracked when pressure or force was applied thereto to clamp them against the rotor core. Since the high points or areas on the arcuate inner surfaces of the magnet material elements and the circumferential surface of the rotor core effected by the aforementioned tolerance variations were clamped directly into the aforementioned surface-to-surface engagement another disadvantageous or undesirable feature of this past method is believed to be that dependable, uniform bond strengths of the hardenable adhesive material could not be attained between the arcuate inner surfaces of the magnet material elements and the circumferential surface of the rotor core. Due to this nonuniformity of bond strength, it is also believed that the rotor assemblies fabricated by this past method may have been acceptable for use in low speed motor applications, such as ceiling fans for instance, but might not have been unacceptable in relatively high speed motor applications, such as clothes washers and various hermetic motor applications for instance. Additionally, it is further believed that another disadvantageous or undesirable feature of rotatable assemblies fabricated by the past method was that the outside diameter or circumference thereof was not constant since the radial distance between the circumferential surface of the rotor core and the arcuate outer surface of each permanent magnet material element may have varied due to the aforementioned tolerance buildup therebetween. While the prior art rotatable assemblies believed to have the above discussed disadvantageous feature may have been acceptable for some relatively low speed motor applications, it is believed that they may have been too far out of balance for use in a motor application of relatively high speeds, say for instance, at least about nine thousand revolutions per minute (9000 rpm) or above. Also with respect to the prior art rotatable assemblies believed to have the above discussed disadvantageous feature, it is believed that a flux gap between a stator bore and the outer arcuate surfaces of the permanent magnet material elements on such prior art rotatable assemblies may have been deleteriously affected. Furthermore, it is also believed that another disadvantageous or undesirable feature of rotatable assemblies manufactured by this past method was that the arc lengths of the permanent magnet material elements may not have been evenly distributed about the circumferential surface of the rotor core thereby also to effect a too far out of balance rotatable assembly for use in the aforementioned higher speed motor applications.

SUMMARY OF THE INVENTION

Among the several objects of the present invention may be noted the provision of an improved method of assembling a rotatable assembly, an improved apparatus for assembling a rotatable assembly, and an improved method of operating apparatus for assembling a rotatable assembly which overcome the above discussed disadvantageous or undesirable features, as well as others, of the prior art; the provision of such improved apparatus and methods in which at least generally equal gaps are provided between adjacent ones of a set of generally arcuate magnet material elements disposed about a circumferential surface of a rotatable member of the rotatable assembly irrespective of any difference in the arcuate lengths of the magnet material elements within preselected tolerance limits therefor; the provision of such improved apparatus and method of operating it in which positioning means for engagement with the adjacent opposed ones of the opposite marginal edges of the magnet material elements are operated thereby from located positions in the apparatus toward adjusting positions to establish the at least generally equal gaps between the adjacent opposed ones of the opposite marginal edges of the magnet material elements; the provision of such improved apparatus and methods in which the arcuate lengths of the magnet material are evenly distributed about the rotatable member; the provision of such improved rotatable assembly having accurate spin balance characteristics; and the provision of such improved apparatus and methods in which the components utilized therein are simple in design, easily assembled and economically manufactured. These as well as other objects and advantageous features of the present invention will be in part apparent and in part pointed out hereinafter.

In general, a method in one form of the invention is provided for assembling a rotatable assembly. The rotatable assembly includes at least one rotatable member having a circumferential surface and a set of generally arcuate magnet material elements each having a pair of generally opposite marginal edges defining the arcuate length of the magnet material element within preselected tolerance limits. The arcuate length of at least one of the magnet material elements is different than that of at least another of magnet material elements within the preselected tolerance limits. In practicing this method, the magnet material elements are moved toward assembly positions with the arcuate lengths thereof extending generally circumferentially about the circumferential surface of the at least one rotatable member, the opposite marginal edges of the magnet material elements, are located during the movement of the magnet material elements toward their assembly positions, respectively. The positions of at least some of the magnet material elements are adjusted generally circumferentially with respect to the circumferential surface of the at least one rotatable member, and thereby at least generally equal spacing is established between adjacent opposed ones of the opposite marginal edges of the magnet material elements so as to compensate for the difference in the arcuate lengths between the at least one magnet material element and the at least another magnet material element during the moving and locating step, respectively.

Further in general and in one form of the invention, apparatus is provided for assembling a rotatable assembly. The rotatable assembly includes at least one rotatable assembly and a set of magnet material elements each having a pair of generally opposite marginal edges defining an arcuate length of the magnet material element within preselected tolerance limits. At least one of the magnet material elements has an arcuate length different than that of at least another of the magnet material element within the preselected tolerance limits. The apparatus has means for disposing the at least one rotatable member in a preselected position and a set of means arranged to receive the magnet material elements and operable generally for moving the magnet material elements toward assembly positions with the arcuate lengths of the magnet material elements disposed generally circumferentially about the at least one rotatable member in the preselected position thereof, respectively. A set of means are associated in engagement with adjacent opposed ones of the opposite marginal edges of the magnet material elements upon the movement of the magnet material elements toward the assembly positions thereof and adjustably movable thereby toward adjusting positions for spacing apart at least generally equally the adjacent opposed ones of the opposite marginal edges of the magnet material elements so as to compensate for the difference between the arcuate lengths of the at least one magnet material element and the at least another magnet material element, respectively.

Still in general, a method is provided in one form of the invention for operating apparatus for assembling a rotatable assembly. The rotatable assembly includes at least one rotatable member having a circumferential surface and a set of magnet material elements each having a pair of generally opposite marginal edges defining an arcuate length thereof within preselected tolerance limits. The arcuate length of at least one of the magnet material elements is different than that of at least another of the magnet material elements within the preselected tolerance limit. The apparatus includes a set of means for receiving the magnet material element and a set of wedge means for positioning engagement with the magnet material elements, respectively. In practicing this method, the at least one rotatable member is disposed in a preselected position therefor in the apparatus, and the magnet material elements are placed in the receiving means therefor with the arcuate lengths of the magnet material elements extending generally circumferentially with respect to the circumferential surface of the at least one rotatable member in the preselected position thereof, respectively. The receiving means are moved toward assembly positions with respect to the at least one rotatable member, and the adjacent opposed ones of the opposite marginal edges of the magnet material elements are engaged with the wedge means, respectively. The arcuate lengths of the magnet material elements are centered between the wedge means in response to the engagement thereof with the adjacent opposed ones of the opposite marginal edges of the magnet material elements, and the wedge means are displaced toward adjusting positions in response to continual movement of the receiving means toward the assembly positions thereof, respectively. At least generally equal gaps are established between the adjacent opposed ones of the opposite marginal edges of the magnet material elements engaged with the wedge means in the adjusting positions thereof, and thereby the arcuate length difference between the at least one magnet material element and the at least another magnet material element is compensated, respectively.

BRIEF DESCRIPTION OF THE DRAWINGS

FIGS. 11A–11D and 12A–12D are schematic representations illustrating the spacing of the gaps which may occur due to tolerance variation in the arcuate lengths of the magnet material elements when the magnet material elements are predeterminately located with respect to the rotatable member in the present invention as compared with such gaps which may occur in the prior art assembly of magnet material elements to the rotatable member without such predetermined location, respectively.

Corresponding reference characters indicate corresponding parts throughout the several views of the drawings.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
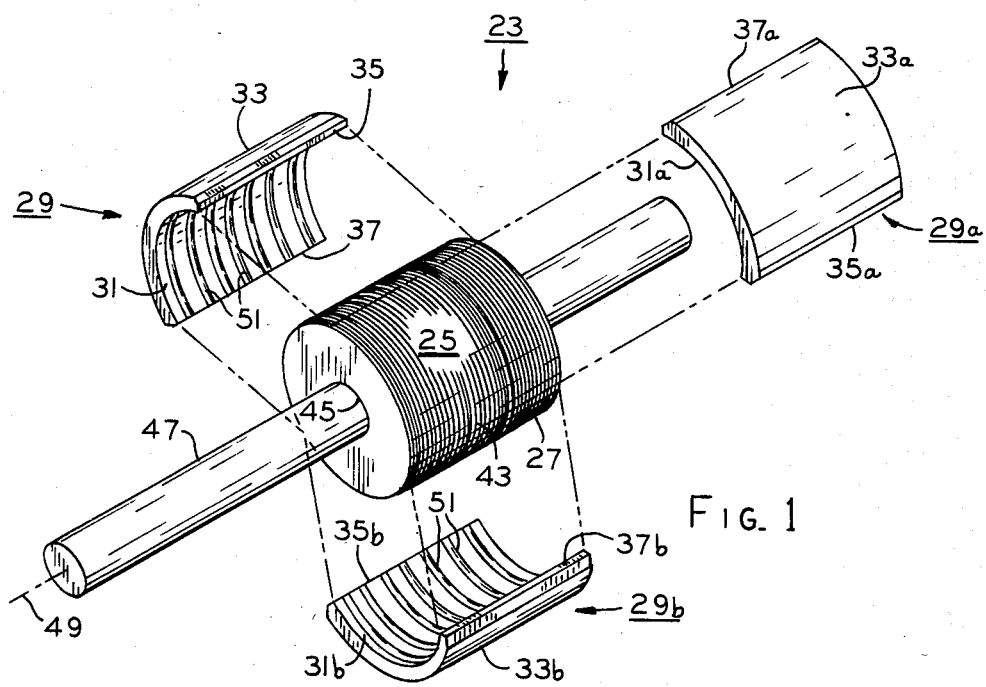
FIG. 1 is an exploded isometric view of a rotatable assembly.
Figure 3:
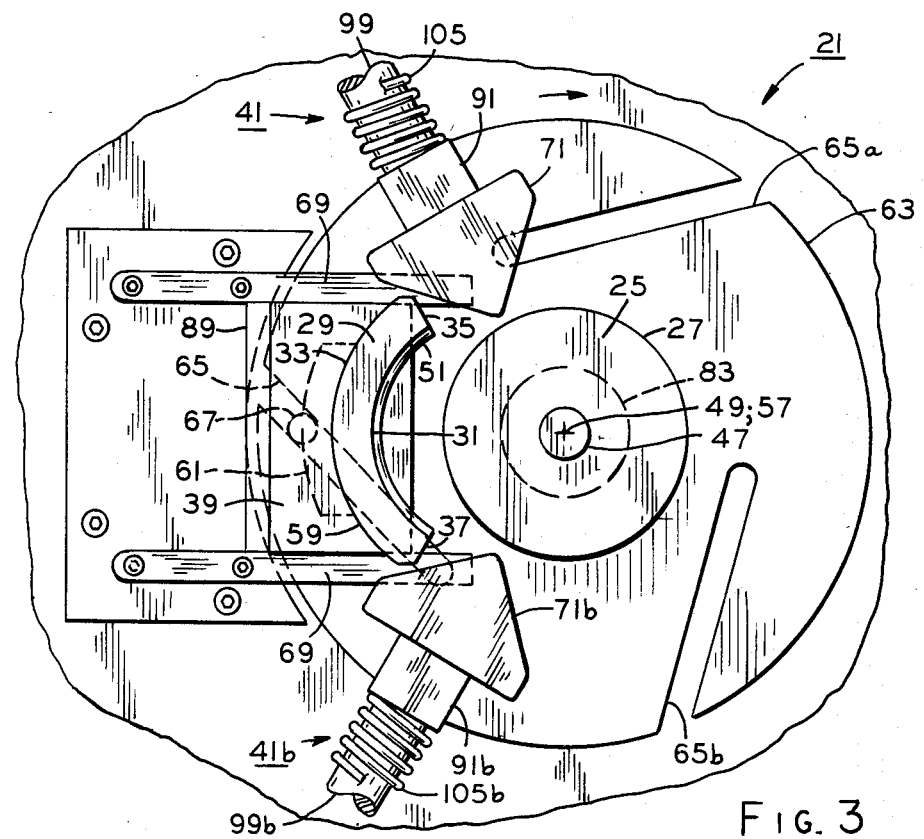
FIG. 3 is an enlarged partial plan view taken from FIG. 2 illustrating only one of the receiving means for one of the magnet material elements in an at-rest position thereof.
Figure 2:
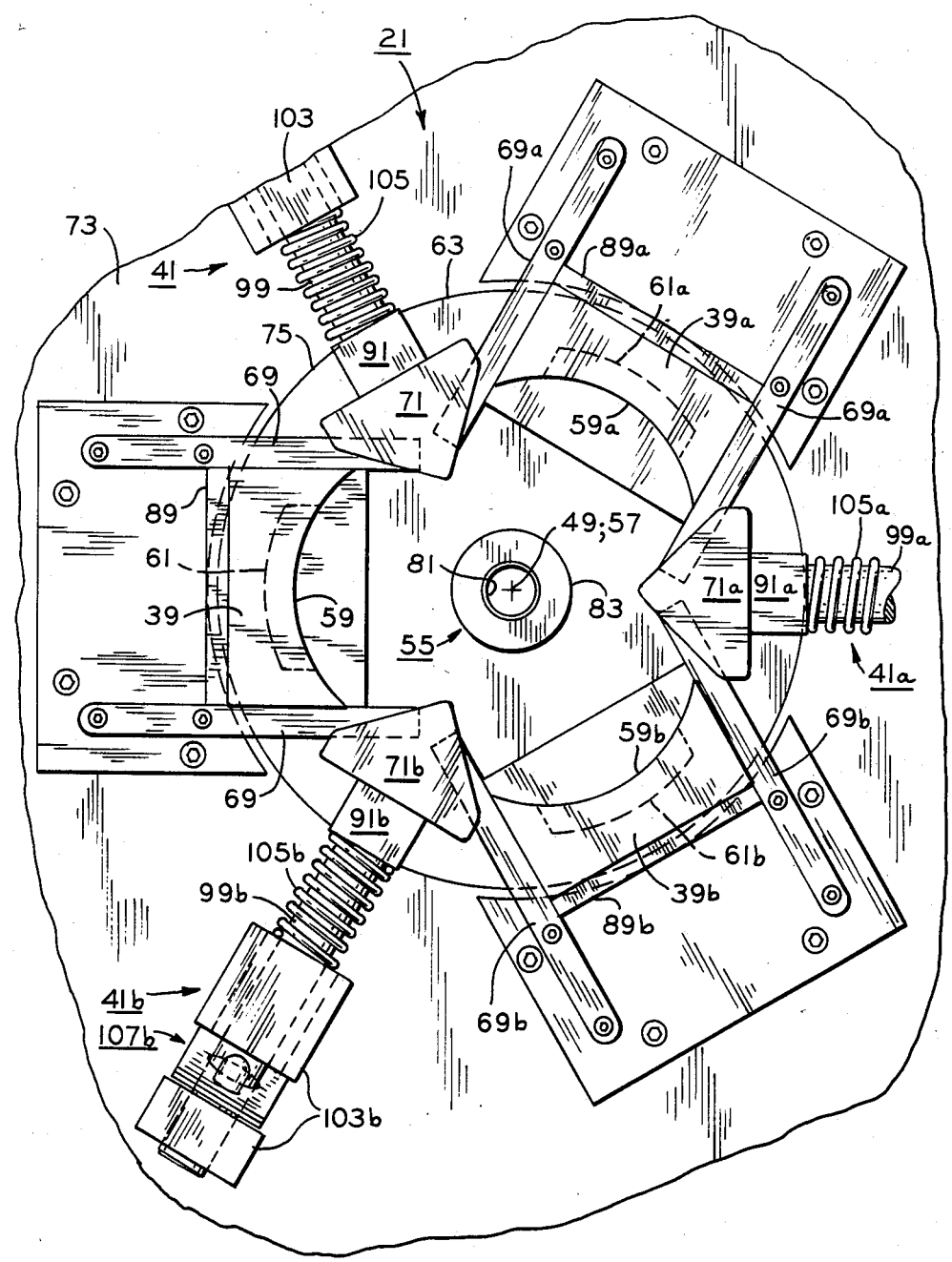
FIG. 2 is a plan view partially in section showing apparatus in one form of the invention for assembling the rotatable assembly of FIG. 1 and also illustrating principles which may be utilized in a method of operating the apparatus and a method of assembling a rotatable assembly in one form of the invention, respectively.
Figure 4:
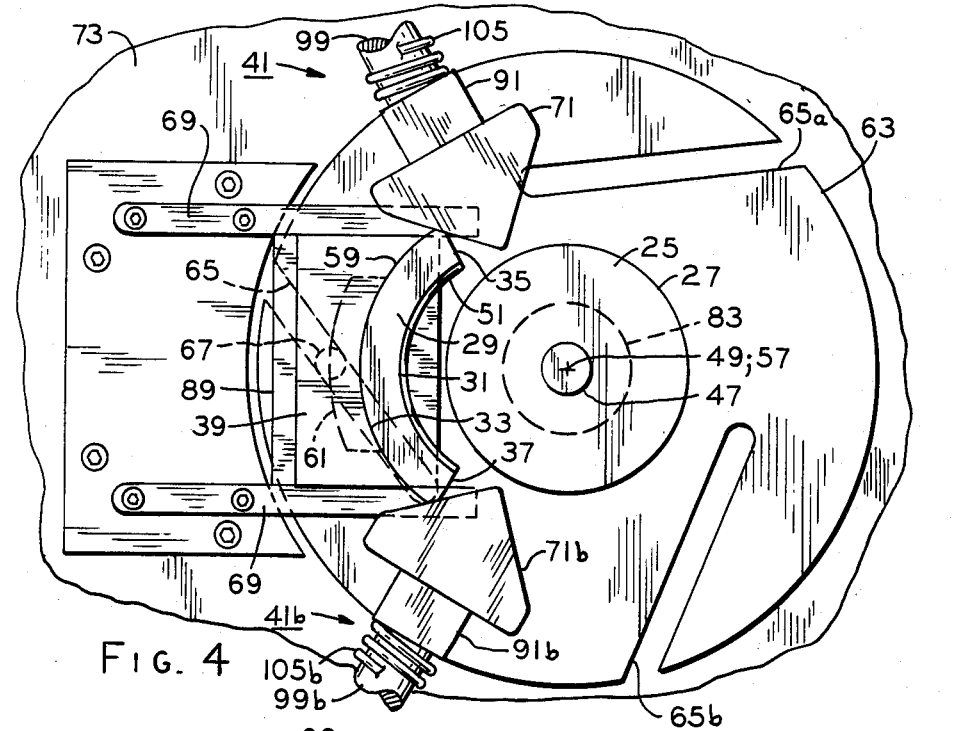
FIG. 4 is generally the same as FIG. 3 but showing the receiving means advanced toward a position engaging the opposite marginal edges of the magnet material element with wedge means in the at-rest positions thereof.
Figure 5:
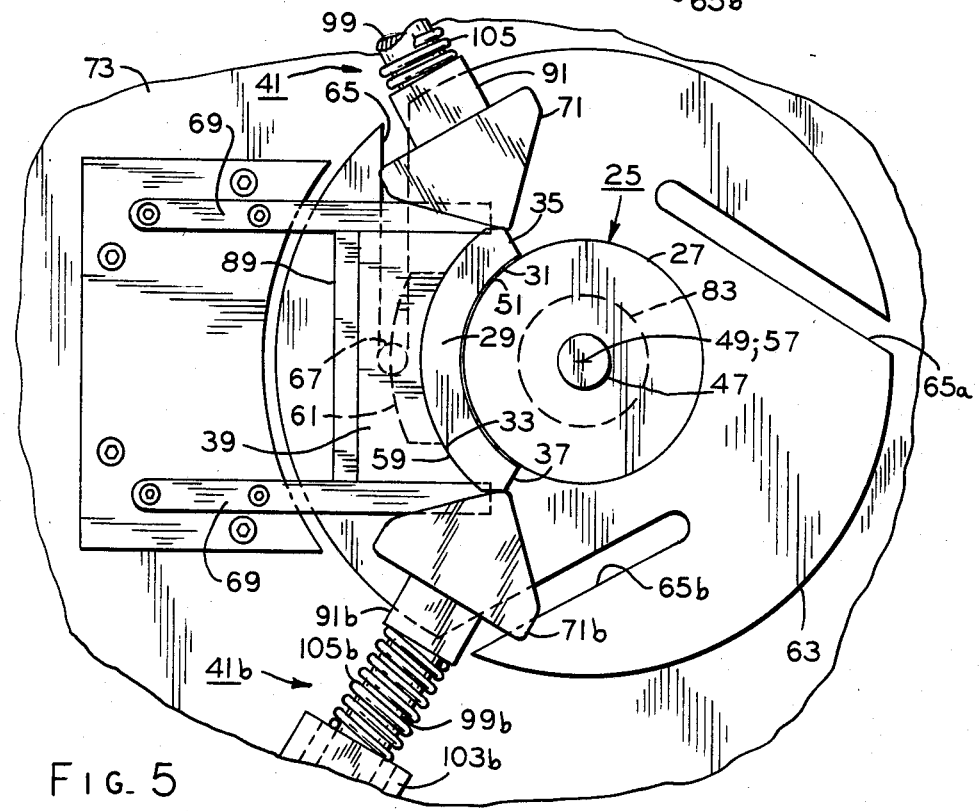
FIG. 5 is generally the same as FIG. 4 but showing the receiving means advanced into the assembly position thereof with the wedge means actuated to the adjusting position thereof.
Figure 6:
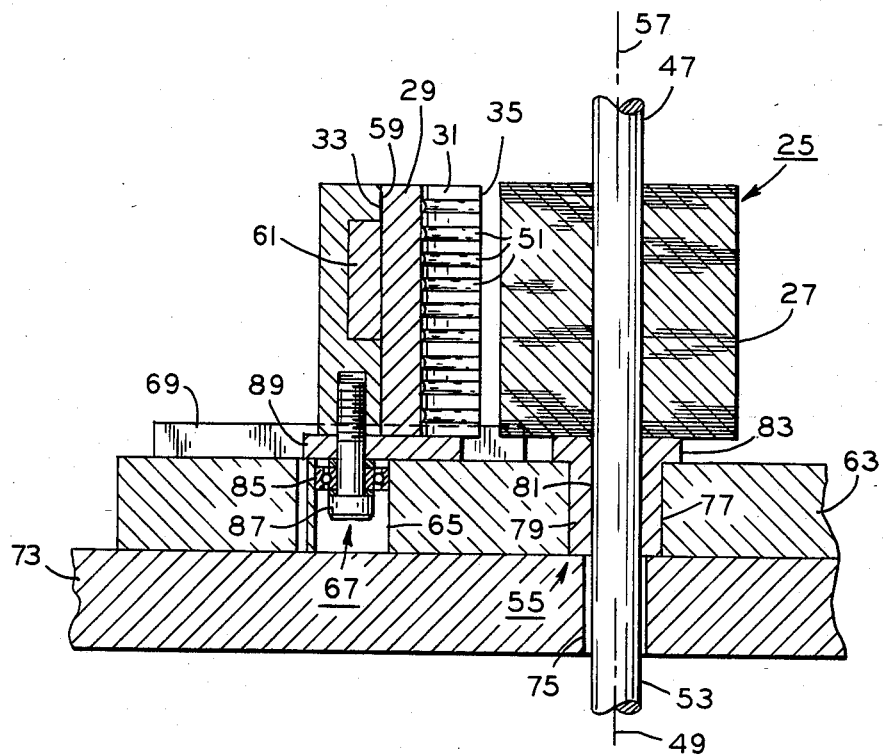
FIG. 6 is an enlarged sectional view taken along line 6—6 in FIG. 5.
Figure 7:
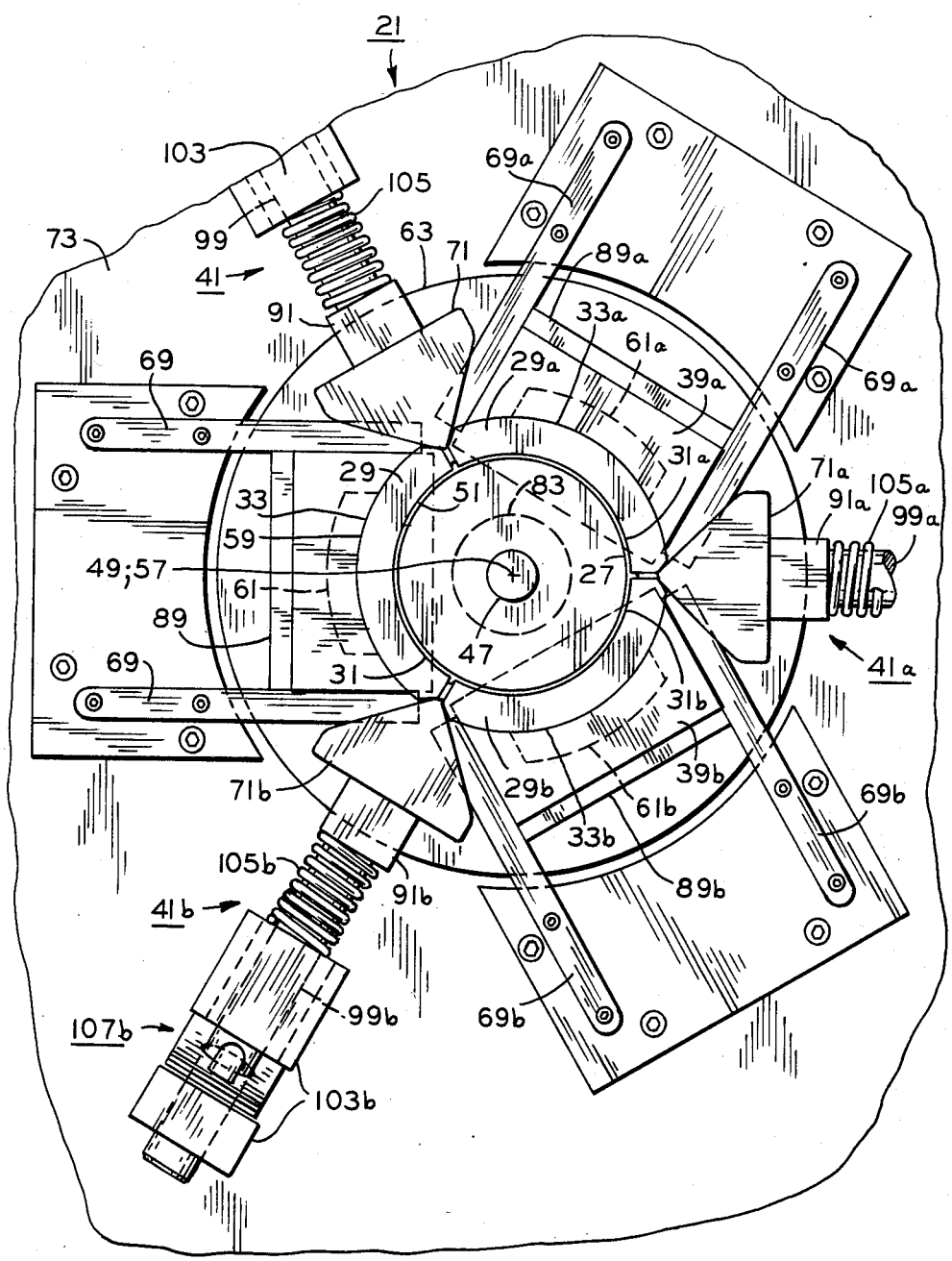
FIG. 7 is the same as FIG. 2 but showing the receiving means of the apparatus actuated into the assembly positions thereof.

With reference to the drawings in general, there is illustrated in one form of the invention a method of operating apparatus 21 for assembling a rotatable assembly 23 adapted for use in a dynamoelectric machine (not shown) (FIGS. 1–10). Rotatable assembly 23 includes at least one rotatable member, such as for instance a rotor core 25 or the like, having a circumferential surface 27 and a set of magnet material elements 29, 29a, 29b having generally arcuate inner and outer surfaces 31, 31a, 31b and 33, 33a, 33b interposed between a pair of generally opposite marginal edges 35, 35a, 35b and 37, 37a, 37b of the magnet material elements generally defining arcuate lengths thereof within preselected tolerance limits (FIG. 1), respectively. The arcuate lengths of at least one of magnet material elements 29, 29a, 29b is different than that of at least another of the magnet material elements within the preselected tolerance limits. Apparatus 21 includes a set of means, such as holders 39, 39a, 39b or the like for instance, for receiving magnet material elements 29, 29a, 29b and a set of means, as indicated generally at 41, 41a, 41b, for positioning engagement with the magnet material elements, respectively (FIG. 2). In practicing this method, the at least one rotatable member or rotor core 25 is disposed in a preselected position therefor in apparatus 21, and magnet material elements 29, 29a, 29b are placed or received in receiving means or holders 39, 39a, 39b therefor with the arcuate lengths of the magnet material elements extending generally circumferentially with respect to circumferential surface 27 of rotor core 25 in the preselected position thereof, respectively (FIGS. 2 and 3). Holders 39, 39a, 39b are moved toward assembly positions with respect to rotor core 25, and the adjacent opposed ones of opposite marginal edges 35, 35a, 35b and 37, 37a, 37b of magnet material elements 29, 29a, 29b are engaged with positioning means 41, 41a, 41b, respectively (FIGS. 4 and 7). The arcuate lengths of magnet material elements 29, 29a, 29b are centered between positioning means 41, 41a, 41b in response to the engagement thereof with the adjacent opposed ones of opposite marginal edges 35, 35a, 35b and 37, 37a, 37b of the magnet material elements, and the positioning means are displaced toward adjusting positions in response to continued movement of holders 39, 39a, 39b toward the assembly positions thereof, respectively (FIGS. 5–7). At least generally equal gaps G are established beween the adjacent opposed ones of the opposite marginal edges 35, 35a, 35b and 37, 37a, 37b of magnet material elements 29, 29a, 29b engaged with positioning means 41, 41a, 41b in the adjusting positions thereof, and thereby the arcuate length difference between the at least one of the magnet material elements and the at least another of the magnet material elements is compensated, respectively (FIGS. 12A–12D).

More particularly and with specific reference to FIG. 1, rotor core 25 of rotatable assembly 23 includes a plurality of rotor laminations 43 which may be interconnected into a stack thereof by suitable means well known to the art, such as welding or an interlocking tab construction or the like for instance (not shown), thereby to form the rotor core having generally cylindric circumferential surface 27 thereon. An opening or bore 45 through the lamination stack of rotor core 25 may be mounted or otherwise secured about a shaft 47 by suitable means, such as for instance heat shrinking or press-fitting or the like, and the rotor core and shaft have a rotaional axis 49. While rotor core 25 is illustrated herein for purposes of disclosure, it is contemplated that various other rotor cores having various different constructions, such as a solid metallic core, a centered iron core, or an edgewise wound strip core for instance, and mounted onto a shaft by various other methods or constructions may be utilized within the scope of the invention so as to meet at least some of the objects thereof.

In a preferred form of the invention, a preselected amount of a hardenable adhesive material 51 is applied in the illustrated beaded pattern thereof onto arcuate inner surfaces 31, 31a, 31b of magnet material elements 29, 29a, 29b prior to the disposition thereof in apparatus 21, and an activator (not shown) for the hardenable adhesive material may be applied by suitable means, such as spraying or the like for instance, onto circumferential surface 27 of rotor core 25 when it is mounted in the apparatus, as discussed in greater detail hereinafter. While hardenable adhesive material 51 and activator therefor discussed herein is Loctite 325 available from Loctite Corporation, Newington, Conn., it is contemplated that various other hardenable adhesive materials may be utilized with or without activators within the scope of the invention so as to meet at least some of the objects thereof. Furthermore, although hardenable adhesive material 51 is illustrated herein as applied in a preselected amount and in a beaded pattern onto magnet material elements 29, 29a, 29b, it is contemplated that random amounts of the hardenable adhesive material may be utilized and that the hardenable adhesive material may be applied in various other patterns or in a coat thereof onto either the magnet material elements or the circumferential surface of the rotor core or both within the scope of the invention so as to meet at least some of the objects thereof.

An end portion 53 of shaft 47 is manually placed or otherwise associated in locating engagement with a mounting device or mounting means 55 of apparatus 21, and the locating engagement of the shaft end portion with the mounting device at least generally aligns rotational axis 49 of rotor core 25 and shaft 47 with a preselected reference axis 57 of apparatus 21 defined by the mounting device, as best seen in FIG. 6. In this manner, circumferential surface 27 of rotor core 25 is disposed generally coaxially about preselected reference axis 57 in apparatus 21 and arranged generally concentrically in radially spaced relation with a set of another arcuate seats or surfaces 59, 59a, 59b on holders 39, 39a, 39b when the holders are in the retracted or at-rest positions thereof, as best seen in FIGS. 2 and 3. It may be noted that the arcs or curvatures of arcuate seats 59, 59a, 59b are predeterminately arranged to define the predetermined outside diameter D of rotatable assembly 23 when holders 39, 39a, 39b are in their advanced or assembly positions locating the seats with respect to each other, as best seen in FIGS. 5 and 7 and as discussed in greater detail hereinafter.

With hardenable adhesive material 51 applied onto arcuate inner surfaces 31, 31a, 31b of magnet material elements 29, 29a, 29b, as previously discussed, the magnet material elements are manually placed or arranged in holders 39, 39a, 39b when the holders are in the retracted positions thereof, respectively, as best seen in FIGS. 2 and 3; however, only one of the holders and magnet material elements is illustrated in FIGS. 3-7 for purposes of drawing simplicity, and the others are discussion in conjunction therewith hereinafter. Upon the placement of magnet material elements 29, 29a, 29b into holders 39, 39a, 39b therefor, arcuate outer surfaces 33, 33a, 33b of the magnet material elements are disposed at least adjacent arcuate seats 59, 59a, 59b in facing or surface-to-surface engagement or relation therewith, and arcuate inner surfaces 31, 31a, 31b of the magnet material elements are disposed in facing relation with circumferential surface 27 of rotor core 25 in its preselected located position with rotational axis 49 of rotor core 25 and shaft 47 aligned with preselected reference axis 57 of apparatus 21, respectively. Means, such as a set of permanent magnets 61, 61a, 61b or the like for instance, are associated with holders 39, 39a, 39b for magnetic attraction or magnetic coupling relation with magnet material elements 29, 29a, 29b thereby to insure or maintain the surface-to-surface relation of arcuate outer surfaces 33, 33a, 33b on the magnet material elements with arcuate seats 59, 59a, 59b therefor on the holders, respectively; however, while the permanent magnets are illustrated herein for purposes of disclosure, it is contemplated that various other means may be associated with the holders for retaining the magnet material elements in the seated positions thereof on the holders within the scope of the invention so as to meet at least some of the objects thereof. Although magnet material elements 29, 29a, 29b are disclosed herein as being manually placed into holders 39, 39a, 39b therefor, it is contemplated that various different transfer or robotic devices may be associated with apparatus 21 for automatically loading or feeding the magneic material elements into the holders therefor within the scope of the invention so as to meet at least some of the objects thereof.

Magnet material elements 29, 29a, 29b may be formed of a frangible ferrite ceramic material and are available from Crucible Magnetics Division of Colt Industries, Elizabethtown, Ky. While magnet material elements 29, 29a, 29b are illustrated herein for purposes of disclosure, it is contemplated that various other magnet material elements of different sizes and configurations and formed of different materials may be utilized within the scope of the invention so as to meet at least some of the objects thereof. Further, in a preferred form of the invention, magnet material elements 29, 29a, 29b are not permanently magnetized until after the assembly of rotatable assembly 23 is completed. It may be noted that the curvature or radius of arcuate locating surfaces 59, 59a, 59b of holders 39, 39a, 39b generally correspond to those of arcuate outer surfaces 33, 33a, 33b of magnet material elements 29, 29a, 29b, and the arcuate lengths of the arcuate locating surfaces are less than the arcuate lengths of the magnet material elements.

Upon the loading of magnet material elements 29, 29a, 29b into holders 39, 39a, 39b therefor, as discussed above, a cam plate 63 may be selectively rotated or actuated in a clockwise direction, as illustrated by the directional arrow in FIG. 3, thereby to effect the actuation or movement of the holders from the at-rest positions toward the assembly positions thereof. In response to this rotation of cam plate 63, a set of cams or cam means, such as for instance cam slots or grooves 65, 65a, 65b or the like, associated with the cam plate are drivingly engaged with a set of cam followers 67, 67a, 67b associated with holders 39, 39a, 39b thereby to move the holders from their at-rest positions generally radially with respect to preselected reference axis 57 of apparatus 21 toward the assembly positions of the holders, respectively. While cam plate 39, cams 65, 65a, 65b, and cam followers 67, 67a, 67b of holders 39, 39a, 39b are illustrated herein for effecting the movement of the holders between their at-rest and assembly positions, it is contemplated that other means may be employed for effecting such movement of the holders within the scope of the invention so as to meet at least some of the objects thereof. Of course, a set means, such as pairs of spaced apart tracks or guides 69, 69a, 69b or the like for instance, are associated in sliding engagement with holders 39, 39a, 39b for guiding them generally radially with respect to preselected reference axis 57 of apparatus 21, respectively. Upon this cam driven movement of holders 39, 39a, 39b, the adjacent opposed ones of opposite marginal edges 35, 35a, 35b and 37, 37a, 37b of magnet material elements 29, 29a, 29b carried in the holders are initially engaged with a set of wedges or wedge means 71, 71a, 71b of positioning means 41, 41a, 41b in the at-rest or locating positions thereof, as may be seen in FIG. 4, and in response to such engagement, the arcuate lengths of the magnet material elements are centered beween the wedges, respectively. It may be noted that in response to the aforementioned caging or centering engagement between the adjacent opposed ones of opposite marginal edges of magnet material elements 29, 29a, 29b and wedges 71, 71a, 71b, the centers of the arcuate lengths of the magnet material elements are not only centered between the wedges but also are centered or aligned with the centers of the arcuate lengths of arcuate seating surfaces 59, 59a, 59b on holders 39, 39a, 39b, respectively. Of course, when magnet material elements 29, 29a, 29b are so adjustably moved into centered or located positions thereof on holders 39, 39a, 39b therefor, the engagements of wedges 71, 71a, 71b with the adjacent opposed ones of the opposite marginal edges 35, 35a, 35b and 37, 37a, 37b of the magnet material elements effects the movement or adjustment of arcuate outer surfaces 33, 33a, 33b on the magnet material elements generally about or circumferentially on arcuate seating surfaces 59, 59a, 59b on the holders while the surface-to-surface engagement therebetween is maintained by the magnetic coupling relation of permanent magnets 61, 61a, 61b with the magnet material elements, respectively. In this manner, magnet material elements 29, 29a, 29b are disposed in their centered positions with respect to holders 39, 39a, 39b, and aligned centers of the arcuate lengths of the magnet material elements and arcuate locating surfaces 59, 59a, 59b are also in radial alignment with preselected reference axis 57 of apparatus 21. It may be noted that the engagement between arcuate outer surfaces 33, 33a, 33b of magnet material elements 29, 29a, 29b and arcuate seats 59, 59a, 59b therefor may not be flush since the arcuate outer surface may have high points or areas thereon due to manufacturing tolerance variations in the magnet material elements; however, such locating engagements between the arcuate seats and the arcuate outer surfaces of the magnet material elements determine the effective outside diameter D of rotatable assembly 23 which will be uniform and controlled within close tolerances, as shown in FIG. 11 and discussed in greater detail hereinafter. Further, it is contemplated that the forces of the engagement between the adjacent opposed ones of the opposite marginal edges 35, 35a, 35b and 37, 37a, 37b of magnet material elements 29, 29a, 29b and wedges 71, 71a, 71b are relatively light being great enough to assure such engagement but not to cause fracture or effect cracking or chipping of the magnet material elements.

In response to continued movement of holders 39, 39a, 39b toward their assembly positions subsequent to the centering of the arcuate lengths of magnet material elements 29, 29a, 29b between wedges 71, 71a, 71b, as discussed above, the forces of the engagement between the adjacent opposed ones of opposite marginal edges 35, 35a, 35b and 37, 37a, 37b with the wedges are effective to adjustably displace or move at least some of the wedges both circumferentially and radially with respect to preselected reference axis 57 from the locating positions of the wedges toward their displaced or adjusting positions thereby to establish at least generally equal gaps G generally circumferentially between the adjacent opposite ones of the marginal edges of the magnet material elements, respectively, as may be seen in FIGS. 5-7. In this manner, the adjusting action of wedges 71, 71a, 71b is effective to readjust or reposition at least some of magnet material elements 29, 29a, 29b from their centered positions generally circumferentially with respect to circumferential surface 27 of rotor core 25 as well as preselected axis 57 of apparatus 21 to establish equal gaps G, and such readjustment of the magnet material elements occurs, of course, generally about the surface-to-surface engagement of arcuate outer surfaces 33, 33a, 33b thereof with arcuate seating surfaces 59, 59a, 59b of holders 39, 39a, 39b, respectively. Thus, the adjustable or driven movement of wedges 71, 71a, 71b into the adjusting positions thereof spaces apart at least generally equally the adjacent ones of opposite marginal edges 35, 35a, 35b and 37, 37a, 37b of magnet material elements 29, 29a, 29b to adjustably establish gaps G, and it may be noted that the establishment of gaps G in the manner discussed above is effective to compensate for any differences in the arcuate lengths within the preselected tolerance limits therefor of the magnet material elements, as illustrated in FIGS. 12A-12D and as discussed in greater detail hereinbelow.

With reference to FIGS. 11A-11D and 12A-12D, assume by way of example that the arcuate lengths between opposite marginal edges 35, 35a, 35b and 37, 37a, 37b of magnet material elements 29, 29a, 29b vary within preselected tolerance limits from a maximum of 120° to a minimum of 117° thereby to have a tolerance variation of 3°. Theoretically, of course, if the arcuate length of all these magnet material elements is 120°, as indicated, the magnet material elements should occupy the entire 360° of circumferential surface 27 of rotor 25 with the opposite marginal edges of the magnet material elements touching or engaging each other. It may be argued that the no gap situation of FIGS. 11A and 12A would never really occur due to the tolerance variation, but the fact remains that if no means is provided to prevent such a gap distribution, then it might occur. For convenience of discussion with respect to FIGS. 11B-11D and 12B-12D, a worst case gap distribution is shown therein with the gaps being accentuated for purpose of drawing simplicity. In FIGS. 11B and 12B, if two of the magnet material elements have minimum arcuate lengths while one has a maximum arcuate length, then a gap of 6° may occur between magnet material elements in the FIG. 11B illustration; however, in comparison therewith all of the gaps in the FIG. 12B illustration are equal, i.e., all are 2°. In FIGS. 11C and 12C, if two of the magnet material elements have maximum arcuate lengths while one has a minimum arcuate length, then a gap of 3° may occur in the FIG. 11C illustration; however, in comparison therewith, all of the gaps in the FIG. 12C illustration are equal, i.e., 1°. In FIGS. 11D and 12D, if all of the magnet material elements have minimum arcuate lengths of 117°, then a gap of 9° may occur between two of the magnet material elements in the FIG. 11D illustration; however, in comparison therewith, the gaps in the FIG. 14D illustration would again be equal or evenly distributed between the magnet material elements, i.e., 3°. Thus, in the light of the foregoing worst case illustrations, it may be noted that the adjusting action of wedges 71, 71a, 71b serves to establish equal gaps G between opposite marginal edges 35, 35a, 35b and 37, 37a, 37b of magnet material elements 29, 29a, 29b, respectively.

Upon the establishment of gaps G in response to the adjusting action of wedges 71, 71a, 71b, the movement of holders 39, 39a, 39b is terminated with the holders being disposed in the assembly positions thereof, and the wedges are retained in their adjusted positions so as to maintain the generally equal spacing between the adjacent opposed ones of opposite marginal edges 35, 35a, 35b and 37, 37a, 37b of magnet material elements 29, 29a, 29b engaged with the wedges, respectively. When holders 39, 39a, 39b are so advanced into the assembly positions thereof, arcuate seating surfaces 59, 59a, 59b on the holders are disposed with respect to each other in positions defining the predetermined outside diameter D of rotatable assembly 23, and arcuate outer surfaces 33, 33a, 33b of magnet material elements 29, 29a, 29b are retained in the surface-to-surface engagement thereof with the arcuate seating surfaces of the holders by the action of permanent magnets 61, 61a, 61b, respectively, as previously discussed. Further, the movement of holders 35, 35a, 35b into the advanced positions thereof also serves to space arcuate inner surfaces 31, 31a, 31b of magnet material elements 29, 29a, 29b within the preselected spatial range R from circumferential surface 27 of rotor core 25 in its located position with rotational axis 49 of the rotor core and shaft 47 aligned with preselected reference axis 57 of apparatus 21. Of course, arcuate inner surfaces 31, 31a, 31b of magnet material elements 29, 29a, 29b may also have high points or areas thereon due to manufacturing tolerance variations in the magnet material elements, but it may be noted that the arcuate inner surfaces of the magnet material elements are predeterminately spaced from circumferential surface 27 of rotor core 25 within preselected spatial range R when holders 39, 39a, 39b are in the advanced positions thereof, respectively, as illustrated in FIG. 7. It has been found that when the tolerance variations between arcuate inner surfaces 31, 31a, 31b and arcuate outer surfaces 33, 33a, 33b of magnet material elements 29, 29a, 29b are at a minimum so that the magnet material elements are relatively thin, the preselected spatial range R may be from generally about 0.002 inches to about 0.003 inches, and when the tolerance variations between the arcuate inner and outer surfaces of the magnet material elements are at a maximum so that the magnet material elements are relatively thick, then preselected spatial range R may be from generally about 0.020 inches to about 0.040 inches. While these variances in preselected spatial range R are believed to be effective in the formation of rotatable assembly 23, it is contemplated that other spatial ranges may be utilized within the scope of the invention so as to meet at least some of the objects thereof. Of course, this predetermined spacing between arcuate inner surfaces 31, 31a, 31b of magnet material elements 29, 29a, 29b and circumferential surface 27 of rotor core 25 obviates engagement therebetween to prevent fracturing, cracking or chipping of the magnet material elements and thereby compensates for the aforementioned tolerance variation between the arcuate inner surfaces and arcuate outer surfaces 33, 33a, 33b of the magnet material elements as well as tolerance variations which may occur in the concentricity of the circumferential surface of the rotor core.

Figure 10:
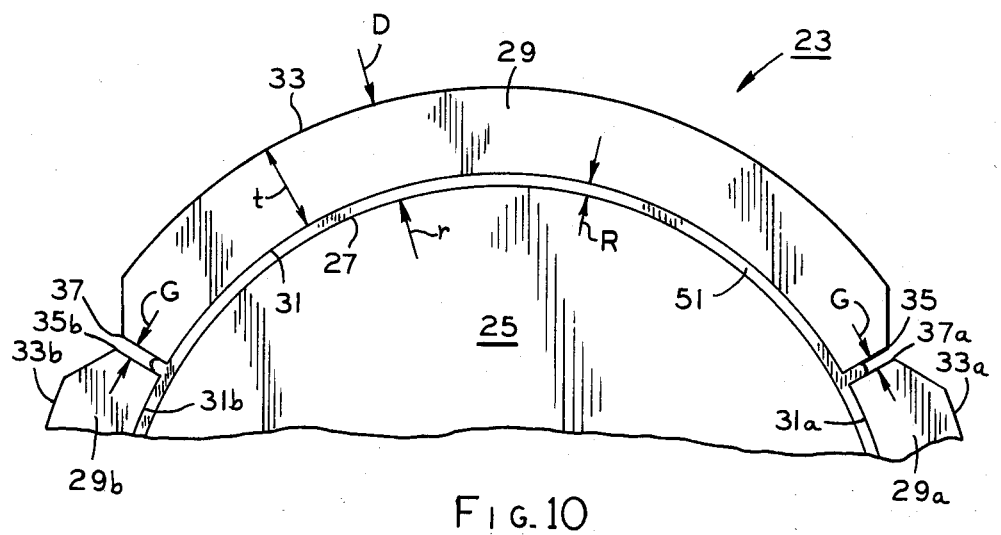
FIG. 10 is an enlarged partial view of the rotatable assembly upon the assembly thereof illustrating at least generally equal gaps circumferentially between the magnet material elements and the preselected spatial range between the arcuate inner surfaces of the magnet material elements and the circumferential surface of a rotatable member of the rotatable assembly, respectively.

Generally as arcuate inner surfaces 31, 31a, 31b of magnet material elements 29, 29a, 29b are brought into the facing and spaced apart relation within the preselected spatial range R with circumferential surface 27 of rotor core 25, as mentioned above, the beads of hardenable adhesive material 51 on the arcuate inner surfaces of the magnet material elements contact the circumferential surface of the rotor core, and at least a part of the hardenable adhesive material is thereby displaced or flowed from the beaded configuration thereof so as to fill at least the spaces established between the circumferential surface of the rotor core and the arcuate inner surfaces of the magnet material elements, as best seen in FIGS. 7 and 10. As previously mentioned, circumferential surface 27 of rotor core 25 may be coated with an activator for hardenable adhesive material 51, and within a predetermined period of time after the hardenable adhesive material contacts the activator therefor on the circumferential surface of the rotor core, the hardenable adhesive material will set up or harden in place in the spaces established between arcuate inner surfaces 31, 31a, 31b of magnet material elements 29, 29a, 29b and the circumferential surface of the rotor core thereby to adhere thereto the magnet material elements, as illustrated in FIG. 10. Thus, with magnet material elements 29, 29a, 29b so adhered to rotor core 25 thereby to form rotatable assembly 23, it may be noted that arcuate outer surfaces 33, 33a, 33b of the magnet material elements in the surface-to-surface engagement thereof with arcuate seats 59, 59a, 59b on holders 39, 39a, 39b define the predetermined outside diameter D of the rotatable assembly and provide a generally constant outer circumferential surface therefor. Thus, regardless of the aforementioned tolerance variations between arcuate inner and outer surfaces 31, 31a, 31b and 33, 33a, 33b of magnet material elements 29, 29a, 29b, predetermined outside diameter D of rotatable assembly 23 is constant or uniform, accurate and very closely controlled.

Upon the hardening or curing of hardenable adhesive material 51 adhering or bonding magnet material elements 29, 29a, 29b to rotor core 25 thereby to form rotatable assembly 23, as discussed hereinabove, the rotatable assembly may be removed from apparatus 21 by manually lifting or otherwise displacing the rotatable assembly from the apparatus thereby to disassociate shaft end portion 53 from mounting device 55 therefor. While the placement of rotor core 25 and shaft 47 into the located position thereof in apparatus 21 and the removal of rotatable assembly 23 from the apparatus has been disclosed herein as being effected manually, it is contemplated that such placement and removal may be effected by various different transfer or robotic equipment associated with the apparatus within the scope of the invention so as to meet at least some of the objects thereof. To complete the description of the method of operating apparatus 21 to assemble rotatable assembly 23, cam plate 63 may be further operated to effect the rotation thereof in the direction opposite the directional arrow in FIG. 3 thereby to again drivingly engage cams 65, 65a, 65b with cam followers 67, 67a, 67b of holders 39, 39a, 39b from the advanced positions to the retracted or at-rest positions thereof, respectively. Thus, regardless of the tolerance variations in the circumferential surface 27 of rotor 25 as may be defined by radius r thereof and the tolerance variation in the thickness t of magnet material elements 29, 29a, 29b, it may be noted that the assembly method of the present invention automatically compensates for such tolerance variations so as to provide a uniform or constant outside diameter D on rotatable assembly 23, which outside diameter may be defined by the following equation:

$$D = 2(t + r + R).$$

For instance, any tolerance variation in thickness t of any two of magnet material elements 29, 29a, 29b and any tolerance variation in radius r of rotor core 25 measured across any diameter of rotatable assembly 23 will be compensated for by the preselected spatial range R in which arcuate inner surfaces 31, 31a, 31b of magnet material elements 29, 29a, 29b are disposed with respect to circumferential surface 27 of the rotor core.

With reference again to the drawings in general and recapitulating at least in part with respect to the foregoing, there is shown in one form of the invention apparatus 21 for assembling rotatable assembly 23 (FIGS. 1–9). Rotatable assembly 23 includes rotor core 25 and magnet material elements 29, 29a, 29b each having opposite marginal edges 35, 35a, 35b and 37, 37a, 37b defining the arcuate lengths thereof within preselected tolerance limits, and at least one of the magnet material elements has an arcuate length different than that of at least another of the magnet material elements within the preselected tolerance limit. Apparatus 21 comprises means, such as mounting device 55 or the like for instance, for disposing or locating rotor core 25 in a preselected position (FIG. 6). A set of means, such as for instance, holders 39, 39a, 39b or the like, are arranged to receive magnet material elements 29, 29a, 29b and are operable generally for moving the magnet material elements toward assembly positions with the arcuate lengths of the magnet material elements disposed generally circumferentially about rotor core 25 in the preselected position thereof, respectively (FIGS. 3–6). A set of means, such as wedges 71, 71a, 71b or the like for intance, are associated in engagement with the adjacent opposed ones of opposite marginal edges 35, 35a, 35b and 37, 37a, 137b of magnet material elements 29, 29a, 29b upon the movement of the magnet material elements toward the assembly positions thereof and are adjustably movable thereby toward adjusting or adjusted positions for spacing apart at least generally equally the adjacent opposed ones of the opposite marginal edges of the magnet material elements so as to compensate for the difference between the arcuate lengths of the aforementioned at least one magnet material element and the at least another magnet material element, respectively (FIGS. 3–9).

More particularly and with specific reference to FIGS. 2 and 7, apparatus 21 is provided with a base 73 having a generally circular opening 75 therethrough, and another opening 77 is generally centrally provided through the cam plate in which mounting device 53 is received with openings 73, 75 being generally in alignment. The details of base 73 as well as the details of the supporting and rotational association of cam plate 63 with the base are believed to be well known to the art and are omitted for purposes of drawing simplicity and brevity of disclosure.

Mounting means 55 comprises a bushing 79 predeterminately arranged or disposed in opening 77 of cam plate 63 of apparatus 21, and the centerline axis of a bore 81 of the bushing defines preselected reference axis 57 of the apparatus, as best seen in FIG. 6. Thus, when rotor core 25 and shaft 47 are disposed in the located position thereof in apparatus 21, shaft end portion 53 is received in locating engagement within bore 81 of bushing 79 thereby to align rotational axis 49 of the rotor core and shaft with preselected reference axis 57 of the apparatus. In order to locate rotor core 25 with respect to cam plate 63 so that circumferential surface 27 of the rotor core is disposed to receive, in the aforementioned spaced apart relation, magnet material elements 29, 29a, 29b carried by holders 39, 39a, 39b, respectively, an end face of the rotor core is engaged with an upper face of bushing which in effect defines an annular spacer 83 or the like for locating the rotor core. As previously mentioned, it is contemplated that various other means, such as transfer or robotic equipment for instance, may be associated with apparatus 21 instead of mounting means or device 55 to maintain rotor core 25 and shaft 47 in the located position thereof in the apparatus.

As best seen in FIGS. 3–6, cams or cam grooves 65, 65a, 65b provided in cam plate 63 have opposed sidewalls between which are received cam followers 67, 67a, 67b in driven engagement therewith, respectively. Cam followers 67, 67a, 67b each comprise a ball bearing 85 having its outer race slidably engaged between the aforementioned opposed sidewalls of cam grooves 65, 65a, 65b and its inner race received about a stud 87 therefor, respectively. Studs 87 extend through a set of slides 89, 89a, 89b into threaded engagement with holders 39, 39a, 39b, and the slides are reciprocally movable in sliding engagement between guides 69, 69a, 69b which are secured by suitable means to base 73 generally adjacent arm plate 63. Slides 89, 89a, 89b may be configured to provide a support or seating means for magnet material elements 29, 29a, 29b when they are disposed on holders 39, 39a, 39b therefor, and although the slides and holders are illustrated herein for purposes of disclosure as being separate pieces, it is contemplated that such slides and holders may be integral within the scope of the invention so as to meet at least some of the objects thereof. Further, it is also contemplated that cams and cam followers other than those illustrated herein for purposes of disclosure may be utilized within the scope of the invention so as to meet at least some of the objects thereof.

Figure 8:
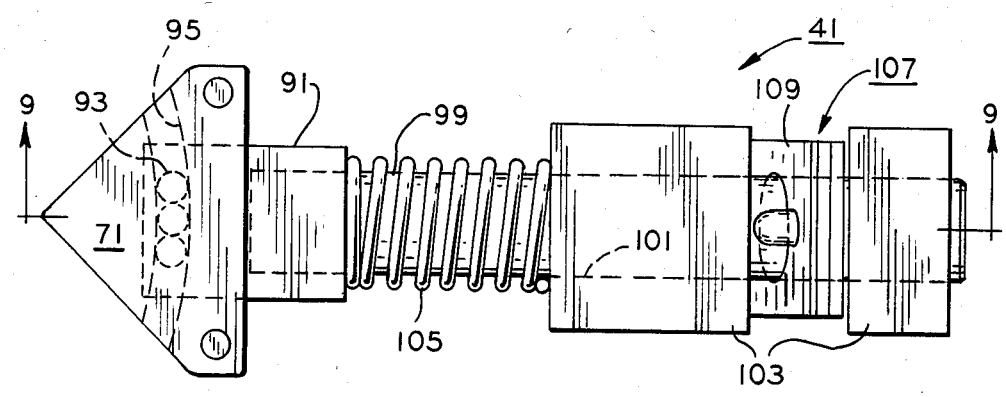
FIG. 8 is an enlarged plan view of one of the wedge means of FIG. 2.
Figure 9:
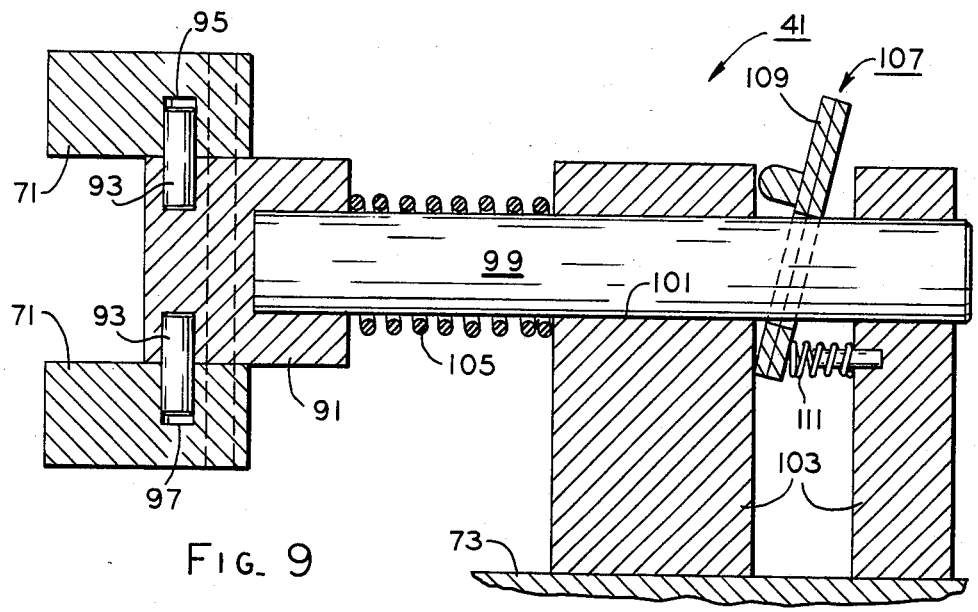
FIG. 9 is a sectional view taken along line 9—9 in FIG. 8.

In FIGS. 8 and 9, only positioning means 41 is shown for purposes of drawing simplicity, but the component parts of positioning means 41a and 41b are discussed hereinafter along with the component parts of positioning means 41. Positioning means 41, 41a, 41b respectively define apparatus for use in assembling rotatable assembly 23. Wedges 71, 71a, 71b of positioning or spacing means 41, 41a, 41b are adjustably carried on a set of means, such as for instance supports or mounting blocks 91, 91a, 91b, for mounting the wedges, and a set of arc pins 93, 93a, 93b are slidably arranged or movable in a set of opposed arcuate slots or grooves 95, 95a, 95b and 97, 97a, 97b having generally the same configuration which are respectively provided in the wedges and the mounting means or mounting blocks for defining the circumferential or pivotal adjusting movement of the wedges. It may be noted that the arcs of arcuate slots 95, 95a, 95b and 97, 97a, 97b are predeterminately configured so as to be at least generally concentric with preselected reference axis 57 of apparatus 21 and thereby also with respect to circumferential surface 27 of rotor core 25 when shaft end portion 53 is received in mounting device 55 thereby to locate rotor core 25 and shaft 47 in the preselected position therefor in the apparatus. A set of guide rods 99, 99a, 99b are reciprocally or slidably movable or displaceably in a set of bores 101, 101a, 101b provided in a set of split supports or supporting means 103, 103a, 103b which are mounted by suitable means in preselected locations therefor on base 83 generally about cam plate 63. Mounting blocks 91, 91a, 91b are fixedly connected by suitable means to free end portions of guide rods 99, 99a, 99b so as to be conjointly reciprocally movable therewith, and a set of resiient means, such as springs 105, 105a, 105b or the like for instance are carried on the guide rods and biased between the mounting blocks and supports 103, 103a, 103b for urging wedges 71, 71a, 71b toward the at-rest or locating positions thereof, respectively. It may be noted that guide rods 99, 99a, 99b are at least generally arranged in radial alignment with respect to preselected reference axis 57 of apparatus 21 so that the movement of the guide rods against the compressive forces of springs 105, 105a, 105b is radially directed so as to define the radial adjusting movement of wedges 71, 71a, 71b, respectively. Thus, it may also be noted that arc pins 93, 93a, 93b and arcuate grooves 95, 95a, 95b and 97, 97a, 97b of wedges 71, 71a, 71b and mounting blocks 91, 91a, 91b not only define the circumferential adjustable movement of the wedges but also effect the radial adjustable movement of the wedges which is conjoint with the radial movement of guide rods 99, 99a, 99b, respectively. To complete the description of positioning means 41, 41a, 41b and apparatus 21, a set of means, such as ratchet devices 107, 107a, 107b or the like for instance, are provided for releasable engagement with guide rods 99, 99a, 99b so as to releasably retain the guide rods against return movement from the displaced position thereof against the compressive forces of springs 105, 105a, 105b as discussed in greater detail hereinafter. Ratchet devices 107, 107a, 107b include a set of tiltable or pivotable washers 109, 109a, 109b carried on guide rods 99, 99a, 99b between split supports 103, 103a, 103b and resiliently or tiltably urged by a set of ratchet springs 111, 111a, 111b toward releasable gripping engagement with the guide rods in a manner well known to the art. Although ratchet devices 107, 107a, 107b are illustrated herein for purposes of disclosure, it is contemplated that various other types of ratchet devices may be utilized with positioning means 41, 41a, 41b within the scope of the invention so as to meet at least some of the objects thereof.

In the operation of apparatus 21, assume that the component parts thereof are in the positions illustrated in FIG. 2 and that rotor core 25 and shaft 47 are in the located position thereof in the apparatus thereby to effect the alignment of rotational axis 49 of the rotor core and shaft with preselected reference axis 57 of the apparatus as best seen in FIG. 6 and as previously discussed. When magnet material elements 29, 29a, 29b with hardenable adhesive material 51 applied thereto are placed in holders 39, 39a, 39b therefor in the at-rest positions thereof, the magnet material elements are supported on slides 89, 89a, 89b, and arcuate outer surfaces 33, 33a, 33b of the magnet material elements are attracted by permanent magnets 61, 61a, 61b into the surface-to-surface engagement thereof with arcuate seats 59, 59a, 59b of the holders, respectively, as best seen in FIG. 3.

Cam plate 63 is rotated through a preselected arc or angle of rotation in the direction of the rotational arrow in FIG. 3, and in response to such rotation of the cam plate, cams 65, 65a, 65b thereof are drivingly engaged with cam followers 67, 67a, 67b to move or drive holders 39, 39a, 39b from the at-rest positions toward the assembly positions thereof, respectively. Of course, slides 89, 89a, 89b associated with holders 39, 39a, 39b are in sliding engagement with guides 69, 69a, 69b thereby to direct the movement of the holders generally radially with respect to preselected reference axis 57 of apparatus 21. As best seen in FIG. 5, during the movement of holders 39, 39a, 39b toward the assembly positions thereof, the adjacent opposed ones of opposite marginal edges 35, 35a, 35b and 37, 37a, 37b of magnet material elements 29, 29a, 29b are initially engaged with wedges 71, 71a, 71b of positioning means 41, 41a, 41b thereby to insure that the arcuate lengths of the magnet material elements are centered between the wedges, respectively, as previously discussed. Thereafter, in response to continued cam driven movement of holders 39, 39a, 39b toward their assembly positions, the forces of the engagement between the adjacent opposed ones of opposite marginal edges 35, 35a, 35b and 37, 37a, 37b with wedges 71, 71a, 71b are effective to cause the adjustable movement of at least some of the wedges toward their adjusting positions thereby to establish the equal gaps G between the adjacent opposed ones of the opposite marginal edges of the magnet material elements, respectively. For instance, any differential between the opposing forces of the engagements between the adjacent opposed ones of opposite marginal edges 35, 35a, 35b and 37, 37a, 37b with wedges 71, 71a, 71b will effect the circumferential adjustable movement of the wedges toward their adjusting positions through the sliding or guidable association of arc pins 93, 93a, 93b within arcuate slots 95, 95a, 95b and 97, 97a, 97b of the wedges and mounting blocks 91, 91a, 91b therefor, respectively. Since the adjacent opposed ones of opposite marginal edges 35, 35a, 35b and 37, 37a, 37b of magnet material elements 29, 29a, 29b are engaged with wedges 71, 71a, 71b, the circumferential adjustable movement of the wedges is effective to drive or adjustably reposition the magnet material elements generally circumferentially with respect to circumferential surface 27 of rotor core 25 as well as preselected reference axis 57 of apparatus 21. Whether any one or more of wedges 71, 71a, 71b are circumferentially adjustably movable, as discussed above, is dependent, of course, upon the respective arcuate lengths of magnet material elements 29, 29a, 29b within the preselected tolerance limits. Simultaneously with the above discussed adjustable repositioning of magnet material elements 29, 29a, 29b in response to the circumferential adjustable movement of wedges 71, 71a, 71b, the wedges are also radially adjustably movable toward their assembly positions. For instance, it may be noted that a wedging action is created upon the engagements of the adjacent opposed ones of opposite marginal edges 35, 35a, 35b and 37, 37a, 37b with wedges 71, 71a, 71b in response to the continued movement of holders 39, 39a, 39b toward their assembly positions. This wedging action is effective to drive wedges 71, 71a, 71b radially outwardly from the at-rest positions toward the adjusting positions thereof against the compressive forces of springs 105, 105a, 105b of positioning means 41, 41a, 41b, respectively. Of course, as previously mentioned, this radial adjustable movement of wedges 71, 71a, 71b concurrently slides guide rods 99, 99a, 99b in bores 101, 101a, 101b of split supports 103, 103a, 103b thereby to predetermine the radial adjustable movement of the wedges toward the adjusting positions thereof, respectively. Ratchet devices 107, 107a, 107b are operative to permit or accommodate the conjoint radial adjustable movement of wedges 71, 71a, 71b and guide rods 99, 99a, 99b, as discussed above, and it may be noted that springs 111, 111a, 111b bias washers 109, 109a, 109b of the ratchet devices into releasable gripping engagement with the guide rods thereby to retain the wedges in their adjusting positions obviating return movement of the wedges in response to the compressive forces of return springs 105, 105a, 105b exerted thereon, respectively. Thus, ratchet devices 107, 107a, 107b in the aforementioned releasable engagement thereof with guide rods 99, 99a, 99b are operative to maintain wedges 71, 71a, 71b in their adjusting positions. Upon both the circumferential and radial adjustable movement of wedges 71, 71a, 71b from the at-rest position to the adjusting positions thereof in response to the forces of the engagements between the adjacent opposed ones of opposite marginal edges 35, 35a, 35b and 37, 37a, 37b of magnet material elements 29, 29a, 29b and the wedges when holders 39, 39a, 39b are moved toward their assembly positions, it may be noted that at least some of the magnet material elements are adjustably repositioned generally circumferentially with respect to circumferential surface 27 of rotor core 25 thereby to establish the equal gaps G between the adjacent opposed ones of the opposite marginal edges of the magnet material elements. Additionally, it may also be noted that the aforementioned adjustable repositioning of magnet material elements 29, 29a, 29b upon the adjusting action of wedges 71, 71a, 71b also compensates for any difference in arcuate length within the preselected tolerance limits between the magnet material elements wherein the equal gaps G are established irrespective of arcuate length difference between the magnet material elements.

If by chance all of magnet material elements 29, 29a, 29b were of equal arcuate lengths, then in this instance, wedges 71, 71a, 71b may be only radially adjustably movable toward their adjusting positions. With the arcuate lengths of magnet material elements 29, 29a, 29b equal, as assumed above, the forces exerted by the adjacent opposed ones of opposite marginal edges 35, 35a, 35b and 37, 37a, 37b on wedges 71, 71a, 71b upon the movement of holders 39, 39a, 39b toward their assembly positions would be generally equal and opposite thereby to obviate any circumferential adjustable movement of the wedges, and in this instance, the only wedging action of the magnet material elements and the wedges occurs whereby the wedges are driven only radially toward their adjusting positions against the compressive forces of springs 105, 105a, 105b of positioning means 41, 41a, 41b, as discussed above.

Upon the rotation of cam plate 63 through the preselected rotational angle thereof, the ends of cam grooves 65, 65a, 65b become engaged with cam followers 67, 67a, 67b of holders 39, 39a, 39b thereby to predeterminately terminate the movement of the holders in the advanced or assembly positions thereof with respect to circumferential surface 27 of rotor core 25 in its preselected position in apparatus 21, respectively. Of course, wedges 71, 71a, 71b are in the adjusting positions thereof, as previously discussed, when holders 39, 39a, 39b are in their advanced positions, respectively. Thus, the adjusting action of wedges 71, 71a, 71b serves to establish the equal gaps G between magnet material elements 29, 29a, 29b, and arcuate inner surfaces 31, 31a, 31b of the magnet material elements are disposed within the preselected spatial range R from circumferential surface 27 of rotor core 25 when holders 39, 39a, 39b are in the advanced positions thereof while arcuate outer surfaces 33, 33a, 33b of the magnet material elements are arranged to establish the preselected outside diameter D of rotatable assembly 23, as previously discussed. In this manner, upon the curing or hardening of hardenable adhesive material 51 filling at least the spaces between arcuate inner surfaces 31, 31a, 31b of magnet material elements 29, 29a, 29b and circumferential surface 27 of rotor core 25 in its preselected position in apparatus 21, the magnet material elements are adhered to the rotor core thereby to complete the formation or assembly of rotatable assembly 23. With magnet material elements 29, 29a, 29b so adhered to rotor core 25, rotatable assembly may be removed from apparatus 21 thereby to disassociate shaft end portion 53 from bore 81 of bushing 79. Cam plate 63 may be further actuated to return it through the rotational angle thereby to effect the return movement of holders 39, 39a, 39b from the advanced positions to the at-rest positions thereof through the driving engagements of cam grooves 65, 65a, 65b with cam followers 67, 67a, 67b of the holders, and ratchet devices 107, 107a, 107b may be pivotally moved against ratchet springs 111, 111a, 111b thereby to release the gripping engagement of the ratchet devices with guide rods 99, 99a, 99b. To complete the operation of apparatus 21, upon the release of ratchet devices 107, 107a, 107b from the gripping engagement thereof with guide rods 99, 99a, 99b, the compressive forces of return springs 105, 105a, 105b are effective to return wedges 71, 71a, 71b to the at-rest positions thereof, respectively.

Figure 13:
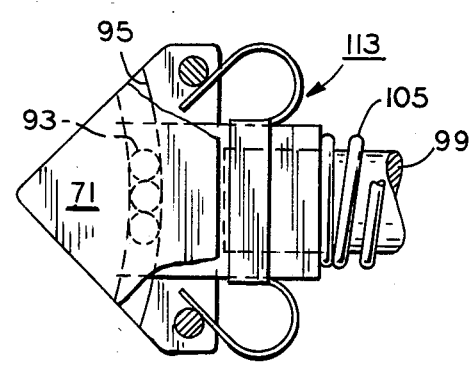
FIG. 13 is a partial plan view taken from FIG. 8 showing an alternative construction of the apparatus shown therein.

As alternatively shown in FIG. 13, resilient means, such as for instance a spring clip 113, 113a, 113b or the like, may be supported in mounting engagement with mounting blocks 91, 91a, 91b and arranged in biasing engagement with wedges 71, 71a, 71b of each positioning means 41, 41a, 41b thereby to maintain the wedges generally centered when the wedges are in the at-rest positions thereof, respectively.

With reference again to the drawings in general and recapitulating at least in part with respect to the foregoing, there is shown rotatable assembly 23 having at least one rotatable member, such as for instance rotor core 25, with circumferential surface 27 (FIG. 1). Magnet material elements 29, 29a, 29b are arranged about circumferential surface 27 of rotor core 25 and include: generally arcuate outer surfaces 33, 33a, 33b defining a constant outer circumference of rotatable assembly 23; generally arcuate inner surfaces 31, 31a, 31b spaced within preselected spatial range R from circumferential surface 27 of rotor core 25; and generally opposite marginal edges 35, 35a, 35b and 37, 37a, 37b interposed between the arcuate inner and outer surfaces and defining the arcuate lengths of the magnet material elements with the adjacent opposed ones of the opposite marginal edges of the magnet material elements being spaced equally apart from each other, respectively (FIGS. 7 and 10). Hardenable adhesive material 51 fills at least the spaces between arcuate inner surfaces 31, 31a, 31b and circumferential surface 27 of rotor core 25 so as to adhere together the magnet material elements and the rotor core, respectively (FIG. 10).

There is also illustrated in one form of the invention a method of assembling rotatable assembly 23 (FIGS. 1-7). Rotatable assembly has rotor core 25 with circumferential surface 27 thereon and magnet material elements 29, 29a, 29b (FIG. 1). Magnet material elements 29, 29a, 29b include generally arcuate inner and outer surfaces 31, 31a, 31b and 33, 33a, 33b interposed between opposite marginal edges 35, 35a, 35b and 37, 37a, 37b defining the arcuate lengths of the magnet material elements within the preselected tolerance limits and with the arcuate length of at least one of the magnet material elements being different than that of at least another of the magnet material elements, respectively (FIG. 1). In practicing this method, magnet material elements 29, 29a, 29b are moved toward assembly positions with respect to circumferential surface 27 of rotor core 25, and arcuate inner surfaces 31, 31a, 31b of the magnet material elements are spaced within preselected spatial range R from the circumferential surface of the rotor core when the magnet material elements are in the assembly positions thereof, respectively (FIGS. 3-6). At least some of magnet material elements 29, 29a, 29b are adjusted generally circumferentially with respect to circumferential surface 27 of rotor core 25, and thereby the adjacent opposed ones of opposite marginal edges 35, 35a, 35b and 37, 37a, 37b of the magnet material elements are spaced apart to establish at least generally equal gaps G therebetween so as to compensate for the arcuate length difference between the aforementioned at least one magnet material element and the at least another magnet material element, respectively (FIGS. 7 and 10).

From the foregoing, it is now apparent that a novel apparatus 21, a novel method of operating such, and a novel method of assembling rotatable assembly 23 have been presented meeting the objects set out as well as others, and it is contemplated that changes as to the present arrangements, shapes, details and connections of the component parts utilized in such apparatus, rotatable assembly and methods and also as to the precise steps and order thereof of such methods may be made by those having ordinary skill in the art without departing from the spirit of the invention or from the scope of the invention as set out in the claims which follow.

What I claim as new and desire to secure by Letters Patent of the United States is:

1. A method of assembling a rotatable assembly with respect to a preselected reference axis, the rotatable assembly including at least one rotatable member having a circumferential surface and a rotational axis, a set of magnet material elements each having generally arcuate inner and outer surfaces interposed between a pair of generally opposite marginal edges defining an arcuate length of the magnet material element within a preselected tolerance limit and with the arcuate length of at least one of the magnet material elements being different than that of at least another of the magnet material elements within the preselected tolerance limit, and a hardenable adhesive material, the method comprising the steps of:

applying the hardenable adhesive material onto at least one of the arcuate inner surfaces of the magnet material elements and the circumferential surface of the at least one rotatable member;

placing the at least one rotatable member in a preselected position with the rotational axis thereof being at least generally coincidental with the preselected reference axis;

arranging the arcuate outer surfaces of the magnet material elements in positions at least generally circumferentially about the preselected reference axis and with the arcuate inner surfaces generally in radially spaced apart and facing relation with the circumferential surface of the at least one rotatable member, respectively;

moving the magnet material elements at least generally radially of the preselected reference axis toward assembly positions with respect to the circumferential surface of the at least one rotatable member and locating the opposite marginal edges of the magnet material elements during the radial movement thereof, respectively;

adjustably repositioning at least some of the magnet material elements generally circumferentially with respect to the circumferential surface of the at least one rotatable member and establishing thereby at least generally equal spacing between adjacent opposed ones of the opposite marginal edges of the magnet material elements so as to compensate for the difference in arcuate length within the preselected tolerance limits between the at least one magnet material element and the at least another magnet material element during the moving and locating step, respectively;

spacing the arcuate inner surfaces of the magnet material elements within a preselected spatial range from the circumferential surface of the at least one rotatable member upon the movement of the magnet material elements into their assembly positions with respect thereto and maintaining the arcuate outer surfaces of the magnet material elements arranged in the at least generally circumferential positions thereof about the preselected axis so as to define an at least generally constant preselected outside diameter of the rotatable assembly when the magnet material elements are in their assembly positions, respectively;

dispersing at least some of the hardenable adhesive material on the at least one of the arcuate inner surfaces of the magnet material elements and the circumferential surface of the at least one rotatable member and filling thereby the spaces established between the arcuate inner surfaces of the magnet material elements and the circumferential surface of the at least one rotatable member during the spacing and maintaining step; and curing the hardenable adhesive material and adhering thereby the magnet material elements in their assembly positions to the circumferential surface of the at least one rotatable member, respectively.

2. A method of assembling a rotatable assembly including at least one rotatable member having a circumferential surface, and a set of generally arcuate magnet material elements each having a pair of generally opposite marginal edges defining the arcuate length of the magnet material element within preselected tolerance limits and with the arcuate length of at least one of the magnet material elements being different than that of at least another of the magnet material elements within the preselected tolerance limits, the method comprising the steps of:

arranging the at least one rotatable member in a preseslected position;

moving the magnet material elements toward assembly positions with the arcuate lengths thereof extending generally circumferentially about the circumferential surface of the at least one rotatable member in its preselected position and locating the opposite marginal edges of the magnet material elements toward their assembly positions, respectively; and adjusting the positions of at least some of the magnet material elements generally circumferentially with respect to the circumferential surface of the at least one rotatable member and establishing thereby at least generally equal spacing between adjacent opposed ones of the opposite marginal edges of the magnet material elements so as to compensate for the difference in the arcuate lengths between the at least one magnet material element and the at least another magnet material element during the moving and locating step, respectively.

3. The method as set forth in claim 2 comprising the additional step of terminating the movement of the magnet material elements and disposing thereby the magnet material elements in their assembly positions with the arcuate lengths of the magnet material elements extending generally circumferentially about the circumferential surface of the at least one rotatable member and with the adjacent opposed ones of the opposite marginal edges of the magnet material elements spaced apart at least generally equally from each other, respectively.

4. The method as set forth in claim 3 wherein the magnet material elements include a generally arcuate surface interposed between the opposite marginal edges and wherein the terminating and disposing step includes spacing the arcuate surface of the magnet material elements within a preselected spatial range from the circumferential surface of the at least one rotatable member when the magnet material elements are in the assembly positions thereof, respectively.

5. The method as set forth in claim 4 wherein the magnet material elements include another generally arcuate surface interposed between the opposite marginal edges and arranged generally in radially spaced relation with the first named arcuate surface and wherein the terminating and disposing step further includes arranging the another arcuate surfaces of the magnet material elements circumferentially about the circumferential surface of the at least one rotatable member so as to define a generally constant preselected outside diameter of the rotatable assembly when the first named arcuate surfaces of the magnet material elements are within the preselected spatial range from the circumferential surface of the at least one rotatable member, respectively.

6. The method as set forth in claim 4 wherein the rotatable assembly further includes a hardenable adhesive material and wherein the method comprises the preliminary step of applying the hardenable adhesive material onto at least one of the arcuate inner surfaces of the magnet material elements and the circumferential surface of the at least one rotatable member, the hardenable adhesive material being at least in part dispersed to fill at least the spaces established between the arcuate inner surfaces of the magnet material elements and the circumferential surface of the at least one rotatable member during the spacing step, respectively.

7. A method of assembling a rotatable assembly including at least one rotatable member having a circumferential surface, and a set of magnet material elements each having generally arcuate inner and outer surfaces interposed between a pair of generally opposite marginal edges defining an arcuate length of the magnet material elements within preselected tolerance limits and with the arcuate length of at least one of the magnet material elements being different than that of at least another of the magnet material elements within the preselected tolerance limit, the method comprising the steps of:

moving the magnet material elements toward assembly positions with respect to the circumferential surface of the at least one rotatable assembly and spacing the arcuate inner surfaces of the magnet material elements within a preselected spatial range from the circumferential surface of the at least one rotatable member when the magnet material elements are in the assembly positions thereof, respectively; and adjusting at least some of the magnet material elements generally circumferentially with respect to the circumferential surface of the at least one rotatable member and spacing apart thereby the adjacent opposed ones of the opposite marginal edges of the magnet material elements to establish at least generally equal gaps circumferentially therebetween and compensate for the arcuate length difference between the at least one magnet material element and the at least another magnet material element during the moving and spacing step, respectively.

8. The method as set forth in claim 7 wherein a set of generally equal arcuate segmental parts equal in number to the magnet material elements are allocated on the circumferential surface of the at least one rotatable member and wherein the adjusting and spacing step includes maintaining the arcuate lengths of at least two of the magnet material elements within the arcuate segmental parts allocated therefor on the circumferential surface of the at least one rotatable member, respectively.

9. The method as set forth in claim 7 wherein the moving and spacing step includes arranging the arcuate outer surfaces generally circumferentially with respect to the circumferential surface of the at least one rotatable member thereby to define a generally constant preselected outside diameter of the rotatable assembly, respectively.

10. The method as set forth in claim 7 wherein the rotatable assembly further includes a hardenable adhesive material and comprising the preliminary step of disposing the hardenable adhesive material on at least one of the arcuate inner surfaces of the magnet material and the circumferential surface of the at least one rotatable member.

11. The method as set forth in claim 10 wherein the moving and spacing step includes dispersing the hardenable adhesive material at least in part to at least fill the spaces established between the arcuate inner surfaces of the magnet material elements and circumferential surface of the at least one rotatable member, respectively.

12. The method as set forth in claim 10 comprising the additional step of curing the hardenable adhesive material and adhering thereby the magnet material elements to the at least one rotatable member, respectively.

13. The method as set forth in claim 7 comprising the preliminary step of disposing the at least one rotatable member in a preselected position.

14. A method of assembling a rotatable assembly including a set of magnet material elements each having a generally arcuate inner and outer surfaces interposed between a pair of generally opposite marginal edges defining an arcuate length of the magnet material element within preselected tolerance limits and with the arcuate length of at least one of the magnet material elements being different than at least another of the magnet material elements within the preselected tolerance limits, and at least one rotatable member having a circumferential surface with a set of equal arcuate segments allocated thereon corresponding to the number of the magnet material elements in the set thereof, respectively, the method comprising the steps of:

disposing the at least one rotatable member in a preselected position;

arranging the magnet material elements at least generally circumferentially about the circumferential surface of the at least one rotatable member and facing thereby the arcuate inner surface of the magnet material elements generally in radially spaced apart relation with respective ones of the arcuate segments on the circumferential surface of the at least one rotatable member, respectively;

moving the magnet material elements generally radially toward assembly positions with respect to the circumferential surface of the at least one rotatable member and confronting the inner arcuate surfaces of the magnet material elements at least generally adjacent the respective ones of the arcuate segments therefor when the magnet material elements are in the assembly positions thereof, respectively; and adjusting during the moving and confronting step at least some of the magnet material elements to move the arcuate inner surfaces thereof generally circumferentially with respect to the respective ones of the confronting arcuate segments therefor so as to space apart at least generally equally the adjacent opposed ones of the opposite marginal edges of the magnet material elements and compensate for the arcuate length difference between the at least one magnet material element and the at least another element and maintaining the arcuate lengths of at least two of the magnet material elements within the arcuate segments on the circumferential surface of the at least one rotatable member when the arcuate inner surfaces of the at least some magnet material elements are adjusted with respect to the respective ones of the confronting arcuate segments therefor, respectively.

15. A method of assembling a rotatable assembly including a set of magnet material elements each having a pair of generally opposite marginal edges defining an arcuate length of the magnet material element within preselected tolerance limits and with the arcuate length of at least one of the magnet material elements being different than that of at least another of the magnet material elements within the tolerance limits, and at least one rotatable member having a circumferential surface with a set of equal arcuate segments allocated thereon corresponding to the number of magnet material elements, the method comprising the stops of:

moving the magnet material elements toward assembly positions with the arcuate lengths of the magnet material elements extending generally circumferentially with respect to the circumferential surface of the at least one rotatable member and associating the arcuate lengths of the magnet material elements so as to at least generally confront the arcuate segments allocated therefor on the circumferential surface of the at least one rotatable member, respectively; and adjusting during the moving and associating step at least some of the magnet material elements generally circumferentially with respect to the confronting arcuate segments allocated therefor on the circumferential surface of the at least one rotatable member thereby to space apart at least generally equally the adjacent opposed ones of the opposite marginal edges of the magnet material elements and compensate for the arcuate length difference between the at least one magnet material element and the at least another magnet material element and maintaining the arcuate lengths of at least two of the magnet material elements within the confronting arcuate segments allocated therefor on the circumferential surface of the at least one rotatable member when the at least some magnet material elements are adjusted with respect thereto, respectively.

16. Apparatus for assembling a rotatable assembly including at least one rotatable member having a rotational axis and a circumferential surface, a set of magnet material elements each having generally arcuate inner and outer surfaces interposed between a pair of generally opposite marginal edges defining an arcuate length of the magnet material element within a preselected tolerance limit, the arcuate length of at least one of the magnet material elements being different than that of at least another of the magnet material elements within the preselected tolerance limit, and a hardenable adhesive material on at least one of the arcuate inner surfaces of the magnet material elements and the circumferential surface of the at least one rotatable member, the apparatus comprising:

a base;

mounting device defining a preselected reference axis of the apparatus associated with said base and adapted for locating engagement with a part of the at least one rotatable member so as to at least generally align the rotational axis of the at least one rotatable member with the preselected reference axis;

a cam plate rotatably associated with said base and including a set of cams, and an opening to accommodate the at least one rotatable member when the part thereof is in the locating engagement with said mounting means;

a set of means movable on generally radially with respect to the preselected reference axis between at-rest and advanced positions for receiving the magnet material elements, said receiving means including a set of seating means for supporting the magnet material elements, a set of another arcuate surfaces arranged generally in surface-to-surface engagement with the arcuate outer surfaces of the magnet material elements so that the arcuate inner surfaces thereof are disposed generally in facing relation with the circumferential surface of the at least one rotatable member, said another arcuate surfaces having a cuvature at least generally corresponding to that of the arcuate outer surfaces of the magnet material elements and having arcuate lengths predeterminately less than that of the magnet material elements, and a set of cam follower means associated with said receiving means for driven engagement with said cam means of said cam plate to effect the movement of said receiving means between the at-rest and advanced positions thereof, respectively;

a set of means mounted to said base and extending generally in overlaying relation with said cam plate for guiding said receiving means between the at-rest and advanced positions thereof, respectively;

actuating means selectively operable for effecting rotation of said cam plate to drivingly engage said cam means with said cam follower means to move said receiving means from their at-rest positions toward their advanced positions and to conjointly move the magnet material elements with said receiving means toward assembly positions of the magnet material elements with respect to the circumferential surface of the at least one rotatable member, the arcuate inner surfaces of the magnet material elements being spaced within a preselected spatial range from the circumferential surface of the at least one rotatable member with the hardenable adhesive material filling at least the spaces established between the arcuate inner surfaces of the magnet material elements and the circumferential surface of the at least one rotatable member when the magnet material elements are in the assembly positions thereof, respectively; and means for establishing at least generally equal gaps circumferentially between adjacent opposed ones of the opposite marginal edges of the magnet material elements thereby to compensate for the different arcuate lengths within the preselected tolerance limits of the at least one magnet material element and the at least another magnet material element, said gap establishing means including a set of wedge means associated in engagement with the adjacent opposed ones of the opposite marginal edges of the magnet material elements upon the movement of the magnet material elements toward their assembly positions and adjustably movable thereby both circumferentially and radially with respect to the preselected reference axis toward adjusting positions for spacing apart the adjacent opposed ones of the opposite marginal edges of the magnet material elements to define the at least generally equal gaps therebetween, a set of means for mounting said wedge means, a set of means associated with said mounting means and said wedge means for defining the adjustable movement of said wedge means generally circumferentially with respect to the preselected reference axis, a set of guide rod means arranged in mounting association with said mounting means and radially movable with respect to the preselected reference axis for accommodating the adjusting movement of said wedge means generally radially with respect thereto, a set of means mounted to said base for supporting in guiding engagement said guide rod means, a set of spring means on said guide rod means and biased between said mounting means and said supporting means for exerting forces in opposition to the adjustable movement of said wedge means toward the adjusting positions thereof generally radially with respect to the preselected reference axis, and a set of means associated with said guide rod means and said supporting means for releasably retaining said guide rod means against return radial movement in response to the forces of the spring means acting on said mounting means at least when said wedge means are in the adjusting positions thereof, respectively.

17. Apparatus for assembling a rotatable assembly including at least one rotatable member having a circumferential surface, and a set of magnet material elements each having generally arcuate inner and outer surfaces interposed between a pair of generally opposite marginal edges defining an arcuate length of the magnet material element within preselected tolerance limits and with the arcuate length of at least one of the magnet material elements being different than that of at least another of the magnet material elements within the preselected tolerance limits, the apparatus comprising:

means for locating engagement with a part of the at least one rotatable member so as to dispose it in a preselected position;

a set of means movable generally radially between at-rest positions and advance positions with respect to the at least one rotatable member in its preselected position for receiving the magnet material elements with the inner arcuate surfaces thereof arranged generally in facing relation with the circumferential surface of the at least one rotatable member, respectively;

a set of means associated with said receiving means and operable generally for effecting the movement of said receiving means from their at-rest positions toward their advanced positions thereby to dispose the magnet material elements in assembly positions with the arcuate inner surfaces thereof arranged about the circumferential surface of the at least rotatable member, respectively; and means for establishing at least generally equal gaps circumferentially between the adjacent opposed ones of the opposite marginal edges of the magnet material elements thereby to compensate for the arcuate length difference between the at least one magnet material element and the at least another magnet material element, said gap establishing means including a set of wedge means associated in engagement with the adjacent opposed ones of the opposite marginal edges of the magnet material elements upon the movement of the magnet material elements toward their assembly positions conjointly with said receiving means toward their advanced positions and adjustably movable thereby both generally circumferentially and radially with respect to the circumferential surface of the at least one rotatable member toward adjusting positions for spacing apart the adjacent opposed ones of the opposite marginal edges of the magnet material elements to define the at least generally equal gaps therebetween, respectively.

18. The apparatus as set forth in claim 17 wherein said gap establishing means further includes a set of means associated with said wedge means for defining the circumferential movement thereof, respectively.

19. The apparatus as set forth in claim 17 wherein said gap establishing means further includes a set of means associated with said wedge means for defining the radial adjustable movement thereof, respectively.

20. The apparatus as set forth in claim 17 wherein said gap establishing means further includes a set of resilient means associated with said wedge means for opposing the circumferential adjustable movement thereof, respectively.

21. The apparatus as set forth in claim 17 wherein said gap establishing means further includes a set of resilient means for opposing the radial adjustable movement of said wedges, respectively.

22. The apparatus as set forth in claim 17 wherein said gap establishing means further comprise a set of means for releasably retaining said wedge means against return from the radial adjustable movement toward the adjusted positions thereof, respectively.

23. Apparatus for assembling a rotatable assembly including at least one rotatable member having a circumferential surface, and a set of magnet material elements each having generally arcuate inner and outer surfaces interposed between a pair of generally opposite marginal edges defining an arcuate length of the magnet material element within preselected tolerance limits and with the arcuate length of at least one of the magnet material elements being different than that of at least another of the magnet material elements within the preselected tolerance limits, the apparatus comprising:

means for disposing the at least one rotatable member in a preselected position;

a set of means arranged to receive the magnet material elements and operable generally for moving the magnet material elements toward assembly positions disposing the arcuate inner surfaces of the magnet material elements generally about the circumferential surface of the at least one rotatable member, respectively;

a set of means operable generally for camming said moving means to effect their operation to dispose the magnet material elements in the assembly positions thereof; and a set of means associated in engagement with the adjacent opposed ones of the opposite marginal edges of the magnet material elements upon the movement of the magnet material elements toward their assembly positions and adjustably movable thereby toward adjusted positions for spacing apart at least generally equally the adjacent opposed ones of the opposite marginal edges of the magnet material elements so as to compensate for the arcuate length difference between the at least one magnet material element and the at least another magnet material element, respectively.

24. The apparatus as set forth in claim 23 wherein said moving means include a set of means for following engagement with said camming means to effect the operation of said moving means, respectively.

25. The apparatus as set forth in claim 23 further comprising a set of means associated with said moving means and operable generally for guiding the movement thereof to effect the disposition of the magnet material elements in the assembly positions thereof, respectively.

26. The apparatus as set forth in claim 23 further comprising a selectively operable cam plate, said camming means including a set of cam grooves in said cam plate, and a set of cam followers associated with said moving means and engaged in driven relation with said cam grooves to effect the operation of said moving means in response to the selective operation of said cam plate, respectively.

27. Apparatus for assembling a rotatable assembly with the rotatable assembly including at least one rotatable member having a circumferential surface, and a set of magnet material elements each having generally arcuate inner and outer surfaces interposed between a pair of generally opposite marginal edges defining an arcuate length of the magnet material elements within preselected tolerance limits and with the arcuate length of at least one of the magnet material elements being different than that of at least another of the magnet material elements within the preselected tolerance limits, the apparatus comprising:

means for disposing the at least one rotatable member in a preselected position;

a set of receiving means for the magnet material elements and operable generally between at-rest positions and advanced positions for moving the magnet material elements toward assembly positions with the arcuate inner surfaces of the magnet material elements being spaced generally circumferentially about the circumferential surface of the at least one rotatable member and within a preselected spatial range therefrom upon the movement of said receiving means to the advanced positions thereof, respectively; and a set of means associated in engagement with the adjacent opposed ones of the opposite marginal edges of the magnet material elements upon the movement of the magnet material elements toward their assembly positions and adjustably movable thereby toward adjusted positions for spacing apart at least generally equally the adjacent opposed ones of the opposite marginal edges of the magnet material elements so as to compensate for the arcuate length difference between the at least one magnet material element and the at least another magnet material element, respectively.

28. The apparatus as set forth in claim 27 wherein said receiving means include means for seating the arcuate outer surfaces of the magnet material elements and arranging them generally circumferentially about the circumferential surface of the at least one rotatable member thereby to define a generally constant preselected outside diameter of the rotatable assembly when said receiving means are in the advanced positions thereof, respectively.

29. The apparatus as set forth in claim 27 wherein the rotatable assembly further includes a hardenable adhesive material applied onto at least one of the arcuate inner surfaces of the magnet material elements and the circumferential surface of the at least one rotatable member, the hardenable adhesive material filling at least the spaces established between the arcuate inner surfaces of the magnet material elements and the circumferential surface of the at least one rotatable assembly upon the movement of said receiving means to the advanced positions thereof, respectively.

30. The apparatus as set forth in claim 27 further comprising a set of means associated with said receiving means and selectively operable for effecting the movement of said receiving means between the at-rest positions and the advanced positions thereof, respectively.

31. Apparatus for assembling a rotatable assembly, the rotatable assembly including at least one rotatable assembly, a set of magnet material elements each having a pair of generally opposite marginal edges defining an arcuate length of the magnet material element within a preselected tolerance, and at least one of the magnet material elements having an arcuate length different than that of at least another of the magnet material element within the preselected limit, the apparatus comprising:

means for disposing the at least one rotatable member in a preselected position;

a set of means arranged to receive the magnet material elements and operable generally for moving the magnet material elements toward assembly positions with the arcuate lengths of the magnet material elements disposed generally circumferentially about the at least one rotatable member in the preselected position thereof, respectively; and a set of means associated in engagement with adjacent opposed ones of the opposite marginal edges of the magnet material elements upon the movement of the magnet material elements toward the assembly positions thereof and adjustably movable thereby toward adjusted positions for spacing apart at least generally equally the adjacent opposed ones of the opposite marginal edges of the magnet material elements so as to compensate for the difference between the arcuate lengths of the at least one magnet material element and the at least another magnet material element, respectively.

32. The apparatus as set forth in claim 31 wherein said spacing means include a set of means operable generally for effecting adjusting displacement of said spacing means toward the adjusted positions thereof generally circumferentially with respect to the at least one rotatable member in the preselected position thereof, respectively.

33. The apparatus as set forth in claim 31 wherein said spacing means include a set of means operable generally for effecting adjusting displacement of said spacing means toward the adjusted positions thereof generally radially with respect to the at least one rotatable member in the preselected position thereof, respectively.

34. The apparatus as set forth in claim 33 wherein said spacing means further include a set of means for opposing the adjusting displacement of said spacing means generally radially toward the adjusted positions thereof, respectively.

35. The apparatus as set forth in claim 33 wherein said spacing means further include a set of means operable generally for releasably retaining said spacing means against return from the adjusting displacement toward the adjusted positions thereof generally radially with respect to the at least one rotatable member in the preselected position thereof, respectively.

36. The apparatus as set forth in claim 31 wherein said spacing means include a set of means for opposing the adjusting displacement of said spacing means generally circumferentially toward the adjusted positions thereof, respectively.

37. A method of operating apparatus for assembling a rotatable assembly, the rotatable assembly including at least one rotatable member having a circumferential surface and a rotational axis, a set of magnet material elements each having generally arcuate inner and outer surfaces interposed between a pair of generally opposite marginal edges defining an arcuate length of the magnet material element within preselected tolerance limits and with the arcuate length of at least one of the magnet material elements being different than that of at least another of the arcuate elements within the preselected tolerance limits, and a hardenable adhesive material applied onto at least one of the arcuate inner surfaces of the magnet material elements and the circumferential surface of the at least one rotatable member, the apparatus including a mounting device defining a preselected reference axis of the apparatus, a set of holders each having another arcuate surface with a curvature at least generally corresponding to that of the arcuate outer surfaces of the magnet material elements, a set of cam followers associated with the holders, a cam plate having a set of cams associated therewith, a set of wedges arranged in locating positions generally radially about the preselected reference axis and movable both circumferentially and radially with respect thereto toward adjusting positions, respectively, the method comprising the steps of:
associating a part of the at least one rotatable member with the mounting device and placing thereby the at least one rotatable member in a preselected position with the rotational axis thereof at least generally aligned with the preselected reference axis of the apparatus;
disposing the magnet material elements in the holders and arranging the arcuate outer surfaces of the magnet material elements at least generally in surface-to-surface engagement with the another arcuate surfaces of the holders so that the arcuate inner surfaces are arranged generally in facing relation with the circumferential surface of the at least one rotatable member in the preselected position thereof, respectively;
rotating the camming plate to drivingly engage the cams thereof with the cam followers of the holders and moving thereby the holders from at-rest positions toward assembly positions generally radially with respect to the preselected reference axis, respectively;
engaging the adjacent opposed ones of the opposite marginal edges with the wedges in the locating positions thereof upon the movement of the holders toward the assembly positions thereof, respectively;
adjusting the magnet material elements generally about the surface-to-surface engagement of the arcuate outer surfaces thereof with the another arcuate surfaces of the holders and centering the arcuate lengths of the magnet material elements between the wedges in response to the engaging step, respectively;
displacing the wedges both generally circumferentially and radially with respect to the preselected reference axis from the locating positions of the wedges toward the adjusting positions thereof upon the continued movement of the holders toward the assembly positions thereof when the adjacent opposed ones of the opposite marginal edges of the magnet material elements are engaged with said wedges and readjusting thereby at least some of the magnet material elements generally about the surface-to-surface engagement of the arcuate outer surfaces thereof with the another arcuate surfaces of at least some of the holders, respectively;
spacing apart at least generally equally the adjacent opposed ones of the opposite marginal edges of the magnet material elements engaged with the wedges and compensating thereby for the arcuate length difference between the at least one magnet material element and the at least another magnet material element during the displacing and readjusting step, respectively;
terminating the movement of the holders in the assembly position thereof and retaining the wedges in the adjusting positions thereof so as to maintain the at least generally equal spacing between the adjacent opposed ones of the opposite marginal edges of the magnet material elements engaged with the wedges, respectively;
spacing the arcuate inner surfaces of the magnet material elements on the holders within a preselected spatial range from the circumferential surface of the at least one rotatable member and dispersing at least in part the hardenable adhesive material on the at least one of the arcuate inner surfaces of the magnet material elements and the circumferential surface of the at least one rotatable member to fill at least the spaces established between the arcuate inner surfaces of the magnet material elements and the circumferential surface of the at least one rotatable member upon the termination of the movement of the holders in the assembly positions thereof, respectively; and
curing the hardenable adhesive material and adhering thereby the magnet material elements to the circumferential surface of the at least one rotatable assembly, respectively.

38. A method of operating apparatus for assembling a rotatable assembly, the rotatable assembly including at least one rotatable member having a circumferential surface, and a set of magnet material elements each having generally arcuate inner and outer surfaces interposed between a pair of generally opposite marginal edges defining an arcuate length of the magnet material element within preselected tolerance limits and with the arcuate length of at least one of the magnet material elements being different than that of at least another of the magnet material elements within the preselected tolerance limits, and the apparatus including a set of means for receiving the magnet material elements, and a set of means for positioning engagement with the magnet material elements and arrange to be movable between located positions in the apparatus toward adjusting positions, respectively, the method comprising the steps of:

disposing the at least one rotatable member in a preselected position therefor in the apparatus;

seating the arcuate outer surfaces of the magnet material elements in engagement with the receiving means therefor and associating thereby the arcuate inner surfaces of the magnet material elements generally in facing relation with the circumferential surface of the at least one rotatable member in the preselected position thereof, respectively;

moving the receiving means generally radially with respect to the at least one rotatable member toward assembly positions and engaging the adjacent opposed ones of the opposite marginal edges of the magnet material elements with the positioning means in the located positions thereof, respectively;

centering the arcuate lengths of the magnet material elements between the positioning means and displacing thereby at least some of the magnet material elements generally about the seating engagement of the arcuate outer surfaces thereof with the receiving means therefor in response to the moving and engaging step, respectively;

displacing the positioning means from their located positions both circumferentially and radially with respect to the at least one rotatable member toward the adjusting positions of the positioning means in response to continued movement of the receiving means toward the assembly positions thereof with the adjacent opposed ones of the opposite marginal edges of the magnet material elements in the engagement thereof with the positioning means and effecting thereby the spacing apart at least generally equally of the adjacent opposed ones of the opposite marginal edges of the magnet material elements in the engagement thereof with the positioning means in their adjusting positions so as to compensate for the arcuate length difference between the at least one magnet material element and the at least another magnet material element, respectively.

39. A method of operating apparatus for assembling a rotatable assembly, the rotatable assembly including at least one rotatable member having a circumferential surface, and a set of magnet material elements each having a pair of generally opposite marginal edges defining an arcuate length thereof within preselected tolerance limits and with the arcuate length of at least one of the magnet material elements being different than that of at least another of the magnet material elements within the preselected tolerance limits, and the apparatus including a set of means for receiving the magnet material elements, and a set of wedge means for positioning engagement with the magnet material elements, respectively, the method comprising the steps of:

disposing the at least one rotatable member in a preselected position therefor in the apparatus;

placing the magnet material elements in the receiving means therefor with the arcuate lengths of the magnet material elements extending generally circumferentially with respect to the circumferential surface of the at least one rotatable member in the preselected position thereof, respectively;

moving the receiving means toward assembly positions with respect to the at least one rotatable member and engaging the adjacent opposed ones of the opposite marginal edges of the magnet material elements with the wedge means, respectively;

centering the arcuate lengths of the magnet material elements between the wedge means in response to the engagement thereof with the adjacent opposed ones of the opposite marginal edges of the magnet material elements and displacing the wedge means toward adjusting positions in response to continued movement of the receiving means toward the assembly position thereof, respectively; and establishing at least generally equal gaps between the adjacent opposed ones of the opposite marginal edges of the magnet material elements engaged with the wedge means in the adjusting positions thereof and compensating thereby for the arcuate length difference between the at least one magnet material element and the at least another magnet material element, respectively.

40. The method as set forth in claim 39 comprising the additional step of terminating the movement of the receiving means in the assembly positions thereof and maintaining the wedge means in the adjusting positions thereof to retain the gaps established during the establishing and compensating step, respectively.

41. The method as set forth in claim 40 wherein each magnet material element has a generally arcuate surface interposed between the opposite marginal edges thereof and wherein the terminating and maintaining step includes locating the receiving means in the assembly positions thereof so that the arcuate surfaces of the magnet material elements define a generally constant preselected outside diameter of the rotatable assembly, respectively.

42. The method as set forth in claim 40 wherein each magnet material element has a generally arcuate surface interposed between the opposite marginal edges thereof and wherein the terminating and maintaining step includes spacing the arcuate surfaces of the magnet material elements within a preselected spatial range from the circumferential surface of the at least one rotatable member when the receiving means are in the assembly positions thereof, respectively.

43. The method as set forth in claim 42 wherein the rotatable assembly includes a hardenable adhesive material applied on at least one of the arcuate surfaces of the magnet material elements and the circumferential surface of the at least one rotatable member and wherein the spacing step includes dispersing at least in part the hardenable adhesive material to fill at least the spaces established between the arcuate surfaces of the magnet material elements and the circumferential surface of the at least one rotatable member within the preselected spatial range thereof, respectively.

44. The method as set forth in claim 43 comprising the additional step of curing the hardenable adhesive material and adhering thereby the magnet material elements to the at least one rotatable member, respectively.

* * * * *